US012591883B2

(12) United States Patent
Jalili

(10) Patent No.: US 12,591,883 B2
(45) Date of Patent: Mar. 31, 2026

(54) METHODS AND SYSTEMS FOR CREATING AND CONTROLLING USE OF TRANSACTION KEYS

(71) Applicant: VAIU GLOBAL, INC., Los Angeles, CA (US)

(72) Inventor: Reza Jalili, Sandy, UT (US)

(73) Assignee: VAIU GLOBAL, INC., Dover, DE (US)

( * ) Notice: Subject to any disclaimer, the term of this patent is extended or adjusted under 35 U.S.C. 154(b) by 0 days.

(21) Appl. No.: 16/616,751

(22) PCT Filed: May 30, 2018

(86) PCT No.: PCT/US2018/035189
§ 371 (c)(1),
(2) Date: Nov. 25, 2019

(87) PCT Pub. No.: WO2018/222752
PCT Pub. Date: Dec. 6, 2018

(65) Prior Publication Data
US 2020/0090170 A1 Mar. 19, 2020

Related U.S. Application Data

(60) Provisional application No. 62/512,724, filed on May 31, 2017.

(51) Int. Cl.
*G06Q 20/38* (2012.01)
*G07C 9/21* (2020.01)

(52) U.S. Cl.
CPC ... *G06Q 20/38215* (2013.01); *G06Q 20/3829* (2013.01); *G07C 9/21* (2020.01)

(58) Field of Classification Search
CPC ................................................. G06Q 20/38215
(Continued)

(56) References Cited

U.S. PATENT DOCUMENTS 3,999,050 A * 12/1976 Pitroda ............... G06F 15/0266
968/936
4,977,595 A 12/1990 Ohta et al.
(Continued)

FOREIGN PATENT DOCUMENTS

EP 2557532 A1 * 2/2013 ............. G06Q 20/12
EP 2701415 A1 * 2/2014 ......... G06F 21/6245
(Continued)

OTHER PUBLICATIONS

PCI. "PCI Mobile Payment Acceptance Security Guidelines for Merchants as End-Users." (Feb. 2013). Retrieved online Apr. 8, 2025. https://www.pcisecuritystandards.org/documents/Mobile_Payment_Security_Guidelines_Merchants_v1.pdf (Year: 2013).*
(Continued)

*Primary Examiner* — James A Reagan
(74) *Attorney, Agent, or Firm* — Gregory M. Howison

(57) ABSTRACT

Creating and controlling a transaction key are provided. Initially, an authorization code is received at a server. This authorization code corresponds to a subsequent transaction that will be performed. Thereafter, a set of parameters are also received at the server. These parameters outline certain requirements that must be met by a requesting device in order to trigger or permit the execution of the transaction. In this manner, both the authorization code and the parameters act as safeguards in controlling which entities are permitted to participate in the transaction.

9 Claims, 28 Drawing Sheets

(58) Field of Classification Search
USPC ........................................................ 705/76
See application file for complete search history.

(56) References Cited

U.S. PATENT DOCUMENTS

| | | | | | |
|---|---|---|---|---|---|
| 5,214,700 | A | 5/1993 | Pinkas et al. | | |
| 5,790,677 | A | 8/1998 | Fox et al. | | |
| 5,806,044 | A | 9/1998 | Powell | | |
| 5,883,810 | A | 3/1999 | Franklin et al. | | |
| 5,884,277 | A | 3/1999 | Khosla | | |
| 6,000,832 | A | 12/1999 | Franklin et al. | | |
| 7,155,411 | B1 * | 12/2006 | Blinn | ................. | G06Q 30/0234 705/40 |
| 7,708,194 | B2 * | 5/2010 | Vawter | ................. | G07F 7/1008 235/382 |
| 7,822,688 | B2 * | 10/2010 | Labrou | ................. | G06Q 20/10 705/67 |
| 8,185,473 | B2 | 5/2012 | Ginter et al. | | |
| 8,195,574 | B2 | 6/2012 | Buehler et al. | | |
| 8,613,070 | B1 * | 12/2013 | Borzycki | ............. | H04L 67/104 726/8 |
| 8,635,462 | B2 * | 1/2014 | Ullmann | ........... | G07C 9/00571 713/193 |
| 8,719,898 | B1 * | 5/2014 | Barton | ................. | G06F 21/604 726/1 |
| 8,788,418 | B2 * | 7/2014 | Spodak | ............... | G06Q 20/105 705/41 |
| 8,930,260 | B2 | 1/2015 | Pappas et al. | | |
| 9,177,316 | B2 * | 11/2015 | Rao | ...................... | G06Q 20/363 |
| 9,454,758 | B2 * | 9/2016 | Desai | ..................... | G06Q 20/40 |
| 9,516,487 | B2 * | 12/2016 | Powell | ............. | H04M 15/8044 |
| 9,760,871 | B1 * | 9/2017 | Pourfallah | ............. | G06Q 10/10 |
| 9,760,882 | B2 | 9/2017 | Myers et al. | | |
| 9,779,345 | B2 * | 10/2017 | Gaddam | .......... | G06K 19/06112 |
| 9,886,691 | B2 * | 2/2018 | Desai | ..................... | G06F 21/57 |
| 10,278,069 | B2 * | 4/2019 | Broch | ................. | H04L 63/0853 |
| 10,489,770 | B2 | 11/2019 | Madden | | |
| 10,546,284 | B2 * | 1/2020 | Desai | ................. | G06Q 30/0641 |
| 10,720,001 | B1 * | 7/2020 | Grosberg | ................. | G07C 9/27 |
| 10,922,641 | B1 | 2/2021 | Biswas et al. | | |
| 10,949,841 | B2 * | 3/2021 | Wagner | ........... | G06Q 20/38215 |
| 10,959,093 | B2 * | 3/2021 | Powell | ................. | H04W 12/06 |
| 2002/0091646 | A1 | 7/2002 | Lake et al. | | |
| 2002/0178385 | A1 | 11/2002 | Dent et al. | | |
| 2004/0044621 | A1 | 3/2004 | Huang et al. | | |
| 2004/0148254 | A1 | 7/2004 | Hauser | | |
| 2004/0257199 | A1 | 12/2004 | Fitzgibbon et al. | | |
| 2005/0071269 | A1 * | 3/2005 | Peters | ................. | H04L 63/0227 705/40 |
| 2005/0187873 | A1 * | 8/2005 | Labrou | ............... | G06Q 20/326 705/40 |
| 2006/0074768 | A1 | 4/2006 | Horton | | |
| 2009/0083739 | A1 * | 3/2009 | Lynch | ..................... | G06F 21/31 718/101 |
| 2012/0036045 | A1 * | 2/2012 | Lowe | ................... | G06Q 20/385 705/26.44 |
| 2013/0267200 | A1 * | 10/2013 | Weiner | ............... | G06Q 20/3278 455/411 |
| 2013/0268437 | A1 * | 10/2013 | Desai | ................. | G06Q 20/3674 705/41 |
| 2014/0020068 | A1 * | 1/2014 | Desai | ................. | G06Q 20/3227 726/4 |
| 2014/0089185 | A1 * | 3/2014 | Desai | ................... | G06Q 10/067 705/41 |

| | | | | | |
|---|---|---|---|---|---|
| 2014/0108792 | A1 * | 4/2014 | Borzycki | ................ | H04L 67/63 713/165 |
| 2014/0109178 | A1 * | 4/2014 | Barton | ................. | G06F 21/604 726/1 |
| 2015/0032634 | A1 | 1/2015 | D'Agostino | | |
| 2015/0067792 | A1 | 3/2015 | Benoit et al. | | |
| 2015/0134968 | A1 * | 5/2015 | Outwater | .............. | B60L 53/665 340/5.6 |
| 2015/0135274 | A1 * | 5/2015 | Huang | ................. | H04L 63/107 726/4 |
| 2015/0271164 | A1 * | 9/2015 | Hamid | ................ | H04L 63/0853 726/7 |
| 2015/0302398 | A1 * | 10/2015 | Desai | ................... | G06Q 20/322 705/41 |
| 2016/0117874 | A1 | 4/2016 | Daniel-Wayman et al. | | |
| 2016/0248782 | A1 * | 8/2016 | Troesch | ................... | G07C 9/20 |
| 2016/0307196 | A1 * | 10/2016 | Achhra | ............. | G06Q 20/3821 |
| 2016/0328707 | A1 * | 11/2016 | Wagner | ................ | G06Q 20/322 |
| 2016/0337346 | A1 * | 11/2016 | Momchilov | ........... | G06F 21/41 |
| 2016/0337351 | A1 * | 11/2016 | Spencer | .............. | H04L 63/0876 |
| 2017/0124570 | A1 * | 5/2017 | Nidamanuri | ....... | G06Q 20/4016 |
| 2017/0286663 | A1 * | 10/2017 | Hurry | .................. | G06F 21/602 |
| 2017/0302702 | A1 * | 10/2017 | Hu | ......................... | G06F 21/554 |
| 2017/0331807 | A1 * | 11/2017 | Mont-Reynaud | ... | H04W 12/082 |
| 2017/0352049 | A1 * | 12/2017 | Tiwary | .............. | G06Q 20/4093 |
| 2017/0364875 | A1 * | 12/2017 | Efroni | ..................... | G06F 21/31 |
| 2018/0025148 | A1 * | 1/2018 | Jain | ........................ | H04L 9/3234 713/166 |
| 2018/0033003 | A1 * | 2/2018 | Koganti | .............. | G06Q 20/385 |
| 2018/0047017 | A1 * | 2/2018 | Li | ....................... | G06Q 20/4014 |
| 2018/0183835 | A1 * | 6/2018 | Bryant | ................. | H04W 12/08 |
| 2018/0351950 | A1 * | 12/2018 | Bao | ..................... | H04L 63/0884 |
| 2019/0073843 | A1 * | 3/2019 | Bryant | ............... | H04L 9/3297 |
| 2019/0089531 | A1 * | 3/2019 | Le Saint | ............... | G06Q 20/20 |
| 2019/0180535 | A1 * | 6/2019 | Novozhenets | ..... | G07C 9/00896 |
| 2019/0325673 | A1 * | 10/2019 | Bardack | ................ | H04L 63/205 |
| 2020/0058028 | A1 * | 2/2020 | Pourfallah | ........... | G06Q 20/425 |
| 2020/0151314 | A1 * | 5/2020 | Hurry | ................. | G06F 21/602 |

FOREIGN PATENT DOCUMENTS

| | | | | |
|---|---|---|---|---|
| WO | 1997045814 | A1 | 12/1997 | |
| WO | WO-2007092715 | A2 * | 8/2007 | ............ G06F 21/32 |

OTHER PUBLICATIONS

Winnard et al. "IBM MFA V1R1 TouchToken, Pass Ticket, and Application Bypass Support." (Dec. 2016). Retrieved online Apr. 8, 2025. https://www.redbooks.ibm.com/redpapers/pdfs/redp5386.pdf (Year: 2016).*

RSA. "RSA® Authentication Manager 8.1 Administrator's Guide." (2013). Retrieved online Apr. 8, 2025. https://www.uvm.edu/~fcs/Doc/SecurID-8.1/RSA%20Authentication%20Manager%208.1%20Administrator%27s%20Guide.pdf (Year: 2013).*

International Search Report of the International Searching Authority dated Aug. 24, 2018 in connection with International Application No. PCT/US18/35189, 2 pages.

Written Opinion of the International Searching Authority dated Aug. 24, 2018 in connection with the International Application No. PCT/US18/35189, 5 pages.

EP: Communication Pursuant to Article 94(3) EPC of EP Application 18810541.5 (related application); Kraska, Nora; Nov. 23, 2023; 6 pages.

* cited by examiner

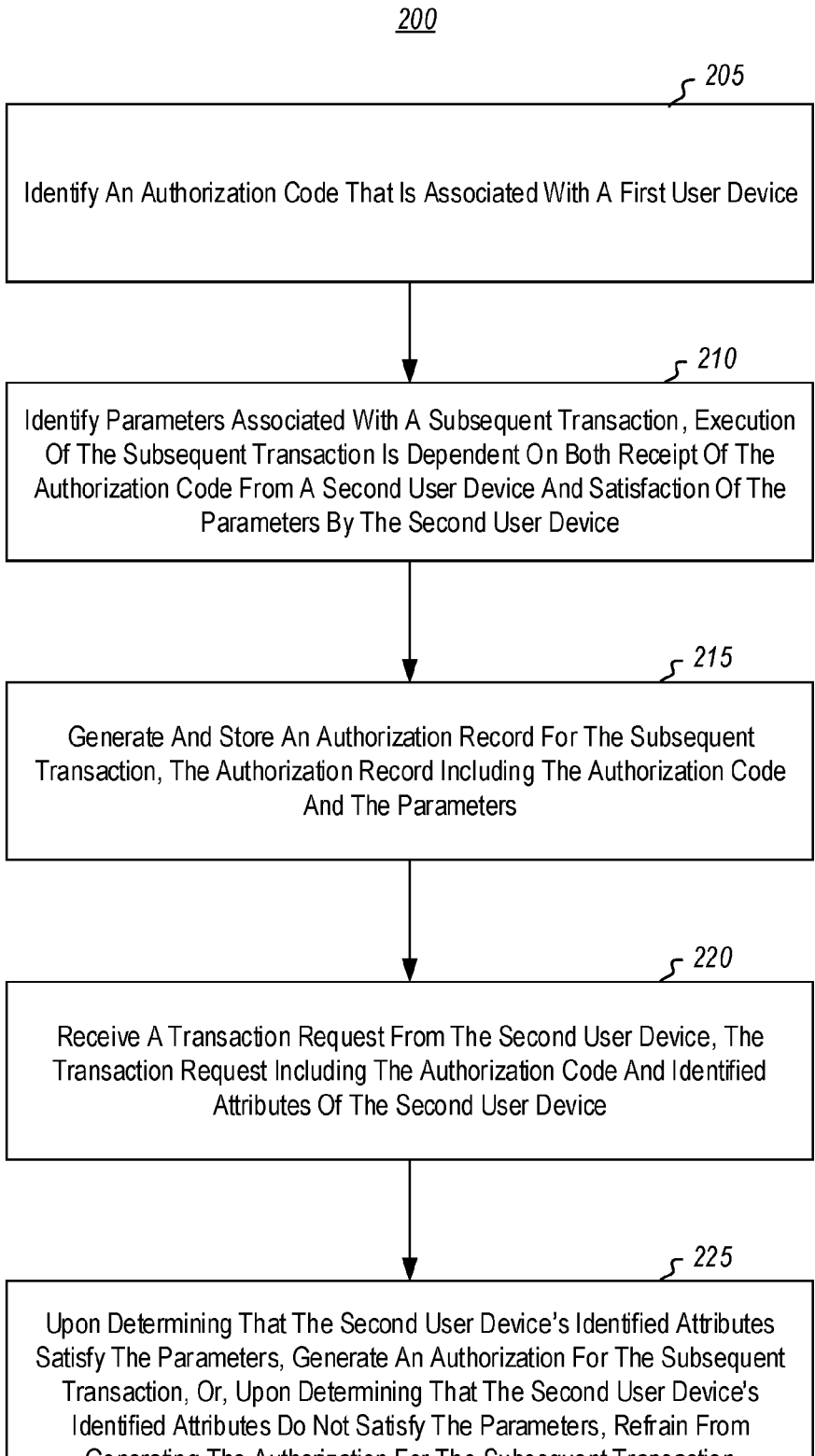

_200_

205

Identify An Authorization Code That Is Associated With A First User Device

210

Identify Parameters Associated With A Subsequent Transaction, Execution Of The Subsequent Transaction Is Dependent On Both Receipt Of The Authorization Code From A Second User Device And Satisfaction Of The Parameters By The Second User Device

215

Generate And Store An Authorization Record For The Subsequent Transaction, The Authorization Record Including The Authorization Code And The Parameters

220

Receive A Transaction Request From The Second User Device, The Transaction Request Including The Authorization Code And Identified Attributes Of The Second User Device

225

Upon Determining That The Second User Device's Identified Attributes Satisfy The Parameters, Generate An Authorization For The Subsequent Transaction, Or, Upon Determining That The Second User Device's Identified Attributes Do Not Satisfy The Parameters, Refrain From Generating The Authorization For The Subsequent Transaction

_FIG. 2_

Parameters

Transaction ID: abc123

Authorized User: X, Y, and Z

Authorized Devices: A, S, and D

Creation Timestamp: 6/1/2018 @ 13:01:25

Expiration: 6/1/2018 @ 16:01:25

Feature: Feature1, Feature2, Feature3

Function: Function1, Function2, Function3

Geographic Location: Location_Data

Status: Pending

Third Party: N/A

Application: Application1

· · ·  805

Authorization Record
800

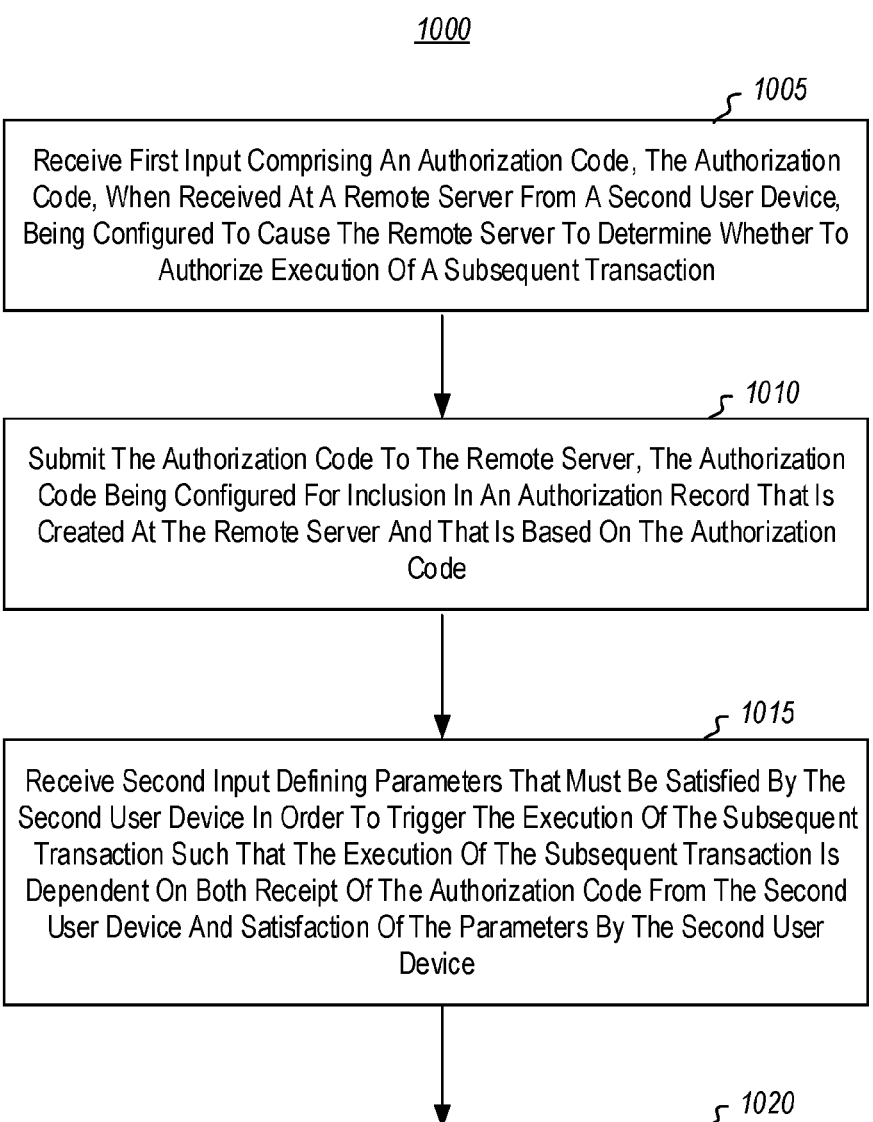

_1000_

_1005_

Receive First Input Comprising An Authorization Code, The Authorization Code, When Received At A Remote Server From A Second User Device, Being Configured To Cause The Remote Server To Determine Whether To Authorize Execution Of A Subsequent Transaction

_1010_

Submit The Authorization Code To The Remote Server, The Authorization Code Being Configured For Inclusion In An Authorization Record That Is Created At The Remote Server And That Is Based On The Authorization Code

_1015_

Receive Second Input Defining Parameters That Must Be Satisfied By The Second User Device In Order To Trigger The Execution Of The Subsequent Transaction Such That The Execution Of The Subsequent Transaction Is Dependent On Both Receipt Of The Authorization Code From The Second User Device And Satisfaction Of The Parameters By The Second User Device

_1020_

Submit The Parameters To The Remote Server, The Parameters Being Configured In A Manner Such That, When Received By The Remote Server, The Parameters Are Linked To The Authorization Code In The Authorization Record That Is Created And Stored By The Remote Database

_FIG. 10_

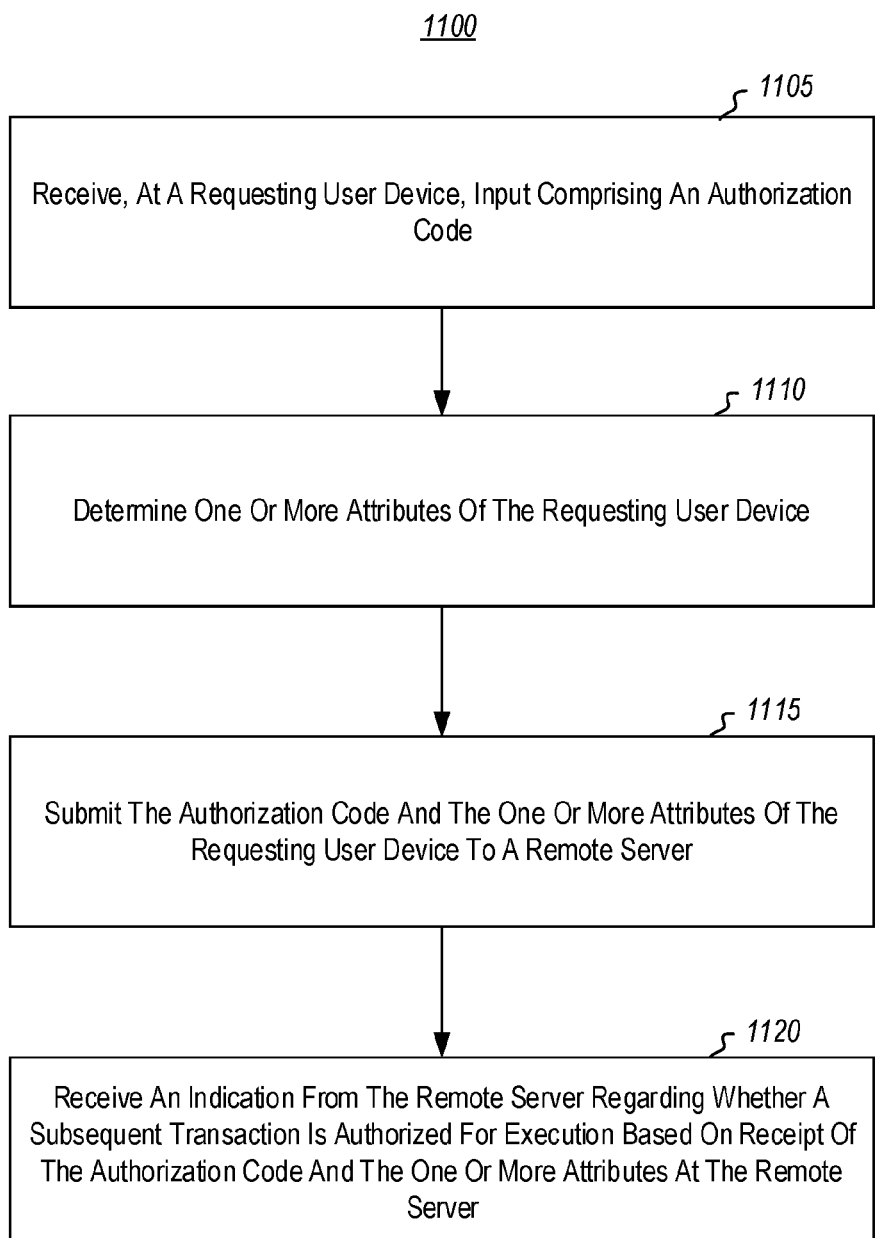

_1100_

_1105_

Receive, At A Requesting User Device, Input Comprising An Authorization Code

_1110_

Determine One Or More Attributes Of The Requesting User Device

_1115_

Submit The Authorization Code And The One Or More Attributes Of The Requesting User Device To A Remote Server

_1120_

Receive An Indication From The Remote Server Regarding Whether A Subsequent Transaction Is Authorized For Execution Based On Receipt Of The Authorization Code And The One Or More Attributes At The Remote Server

_FIG. 11_

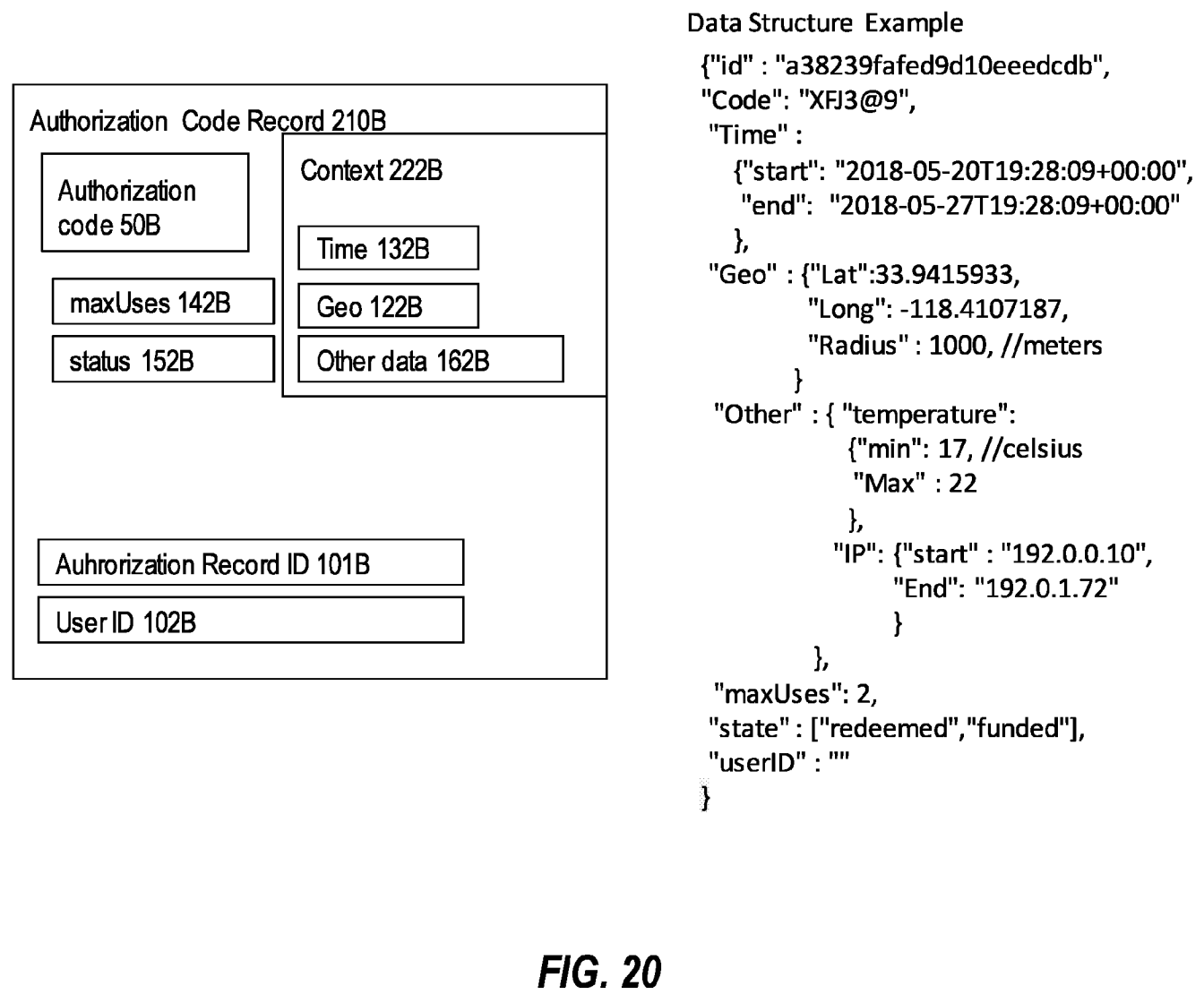

Data Structure Example

```
{"id" : "a38239fafed9d10eeedcdb",
"Code": "XFJ3@9",
"Time" :
    {"start": "2018-05-20T19:28:09+00:00",
     "end": "2018-05-27T19:28:09+00:00"
    },
"Geo" : {"Lat":33.9415933,
         "Long":-118.4107187,
         "Radius" : 1000, //meters
        }
"Other" : { "temperature":
            {"min": 17, //celsius
             "Max" : 22
            },
            "IP": {"start" : "192.0.0.10",
                   "End": "192.0.1.72"
                  }
           },
"maxUses": 2,
"state": ["redeemed","funded"],
"userID" : ""
}
```

Authorization Code Record 210B

Context 222B

Time 132B

Geo 122B

Other data 162B

Authorization code 50B maxUses 142B status 152B

Authorization Record ID 101B

User ID 102B

FIG. 20

Data Structure Example

```
{"id" : unique_database_key,
"action": "deposit($this.payer, $user, $this.amount);",
"amount" : {"currency": "USD" ,
            "Amount" : 5.25
                                }
}
```

Authorization Record 401B

| Authorized Action 410B | Amount 112B |

Data Structure Example with Cloud Function

```
{"id" : unique_database_key,
"action": {"url": "https://[REGION]-[PROJECT_ID].cloudfunctions.net/deposit-1ffeabc9873aabd7fde79342"}
}
```

Sample Bitcoin Key  9999

0C28FCA386C7A227600B2FE50B7CAE_SAMPLE_PRIVATE_KEY_DO_NOT_IMPORT_11EC86D3BF1FBE471B
E89827E19D72AA1D

*FIG. 22*

Authorized Action as Cloud Function

Example Cloud Function

```
const amount = 5.25;

const currency = "USD";

const Transactor = require(...);

const transactor = new Transactor();

exports.withdraw = (req, res) => { transactor.deposit(req.user,currency, amount);

res.send('success!');

Datastores

TABLE 520B
of Who Triggered Authorized Action
1.  Authorization Record ID, User ID
2.  Authorization Record ID, User ID
3.  Authorization Record ID, User ID
4.  : :
5.  : :
.  .

TABLE 530B
Mapping Codes to Creator
1.  Authorization Code Record ID, User ID
2.  Authorization Code Record ID, User ID
3.  Authorization Code Record ID, User ID
4.  : :
5.  : :
.  .

TABLE 550B
of Authorization Code Records
1.  Authorization Code Record
2.  Authorization Code Record
3.  Authorization Code Record
4.  : :
5.  : :
.  .

TABLE 510B
of Authorization Records
1.  Authorization Record
2.  Authorization Record
3.  Authorization Record
4.  : :
5.  : :
.  .

*FIG. 25*

METHODS AND SYSTEMS FOR CREATING AND CONTROLLING USE OF TRANSACTION KEYS

CROSS-REFERENCE TO RELATED APPLICATIONS

The present application is a U.S. National Stage of International Application No. PCT/US2018/035189, filed on May 30, 2018, designating the United States and claiming the benefit of and priority to U.S. Provisional Application No. 62/512,724 filed on May 31, 2017, the entirety of each of which are incorporated herein by this reference.

BACKGROUND

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS")), and deployment models (e.g., private cloud, community cloud, public cloud, hybrid cloud, etc.).

Cloud and remote based service applications are prevalent. Such applications may be hosted on public and private remote systems (such as clouds) and usually offer a set of web-based services for communicating back and forth with clients.

One benefit of interconnecting computing systems (e.g., in the cloud) is that services can be provided to any number of users at the same time. For example, systems are currently in place to enable humans to connect with other humans via their computing devices. While some connection systems are currently available, these systems have many drawbacks and deficiencies, especially with regard to passing data or transmitting application features/functionalities to other users who may not have the same application. For example, because may services and applications often require users to use that particular application, it can be a time intensive, laborious, or expensive (e.g., mobile data usage or other expenses) to interconnect multiple applications, services, or users. As such, conventional techniques for connecting users are very rigid and fail to provide flexibility.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments relate to systems and methods that create and control a transaction key/authorization record in a dynamic and/or real-time manner. In some embodiments, an authorization code is initially identified at a server computer system. This code is associated with a first user device. Because of how the code is configured, when it is received from a second user device, then the code causes the server to determine whether to authorize the execution of a subsequent transaction. After this code is identified (but before it is received from the second user device), the server identifies a set of parameters that are associated with the transaction. These parameters correspond to input entered at the first user device and at least partially define requirements that must be met by the second user device in order to trigger the execution of the transaction. In this regard, the execution of the transaction is dependent on both the code and the fulfillment of the parameters. Thereafter, a record is generated and stored. This record includes the code as well as the parameters. After the record is generated, then a transaction request is received from the second device. This request includes the authorization code as well as certain attributes of the second user device. If these attributes adequately satisfy the parameters, then the server grants permission for the transaction to proceed. If, however, the attributes do no satisfy the parameters, then the server will not grant permission.

In some embodiments, a user device receives input that includes an authorization code, which is configured in the manner described above. Then, the user device submits that authorization code to a remote server, which stores the authorization code in an authorization record. The user device then receives additional input. This new input defines a set of parameters that must be satisfied by a second (i.e. different) user device in order to trigger the execution of a subsequent transaction that is associated with the authorization code. Consequently, this transaction is based on two factors, namely, submission of the correct authorization code and verification that the second device adequately satisfies the defined parameters.

In some embodiments, a requesting user device receives input that includes an authorization code. This authorization code will be submitted to a remote server in an attempt to initiate the execution of a particular transaction. Then, the requesting user device determines some of its own attributes. The authorization code and the attributes are then submitted to the remote server. Subsequently, the requesting device receives an indication from the remote server regarding whether the transaction is authorized for execution. Notably, the transaction will be authorized when certain parameters associated with the transaction are adequately satisfied by the requesting user device's attributes. In contrast, the transaction will not be authorized if the attributes do not satisfy the parameters.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 2 illustrates a flowchart of an example method for causing a server to create and control a transaction key or authorization record that includes an authorization code and a set of defined parameters.

FIG. 10 illustrates a flowchart of an example method, taken from the viewpoint of a submitting user device, in order to initiate the creation and control of a transaction key/record.

FIG. 11 illustrates a flowchart of an example method, taken from the viewpoint of a requesting user device, in order to request authorization to participate in a particular transaction.

FIG. 20 depicts a schematic of a data structure for an authorization code record and an example of an authorization code record.

FIG. 22 depicts a schematic of a data structure for an authorization record and an example of an authorization record.

FIG. 24 depicts an example of a cloud function, which can be an authorized action.

FIG. 25 depicts a schematic of datastores used in the system.

DETAILED DESCRIPTION

The disclosed embodiments are directed to systems and methods that create and control access to a transaction key/authorization record in a dynamic and/or real-time manner. In some embodiments, an authorization code is identified at a server. This code is associated with a subsequent transaction. Then, a set of parameters are received. These parameters define various requirements that a requesting device must satisfy in order for the server to authorize the execution of the transaction. The server then bundles the code and the parameters together to form an authorization record. Later, the server receives information from a user device that is requesting that the transaction be performed. If the information in the request corresponds to the information in the authorization record, then the transaction will be permitted. If there is no correlation or if there is not an adequate amount of correlation, then the server will not permit the transaction to be performed.

In some embodiments, a submitting user device submits an authorization code to a remote server. Then, the submitting user device submits a set of parameters that must be satisfied in order for a transaction to occur. The remote server then bundles this information together to form an authorization record.

In some embodiments, a requesting device obtains an authorization code. Then, various attributes of the requesting device are determined. The requesting device transmits both the authorization code and the attributes to a remote server in an attempt to cause the server to authorize the execution of a particular transaction. If the transmitted information corresponds to information stored on the remote server, then the remote server will authorize the transaction. If there is not an adequate degree of correlation, however, then the remote server will not authorize the transaction.

Accordingly, significant advantages are realized by practicing the disclosed embodiments. In particular, the embodiments enable the quick execution of any type of transaction, be it a financial transaction, an entry through a physical barrier, or any other type of transaction. Additional advantages are realized because the disclosed embodiments promote anonymity and help safeguard user data. Furthermore, the disclosed embodiments operate to dramatically improve a user's experience by helping the user to efficiently control how and when a transaction will occur and by enabling similar transactions to occur over different types of systems and interfaces, without requiring a user to download applications for each type of system/interface. The disclosed embodiments also provide a layer of abstraction for enabling anonymity when performing transactions. In this manner, the disclosed embodiments provide many improvements and advantages over existing transaction systems because they provide a highly flexible and robust system for connecting any number of users and for controlling the management of a transaction key.

Figure 1:
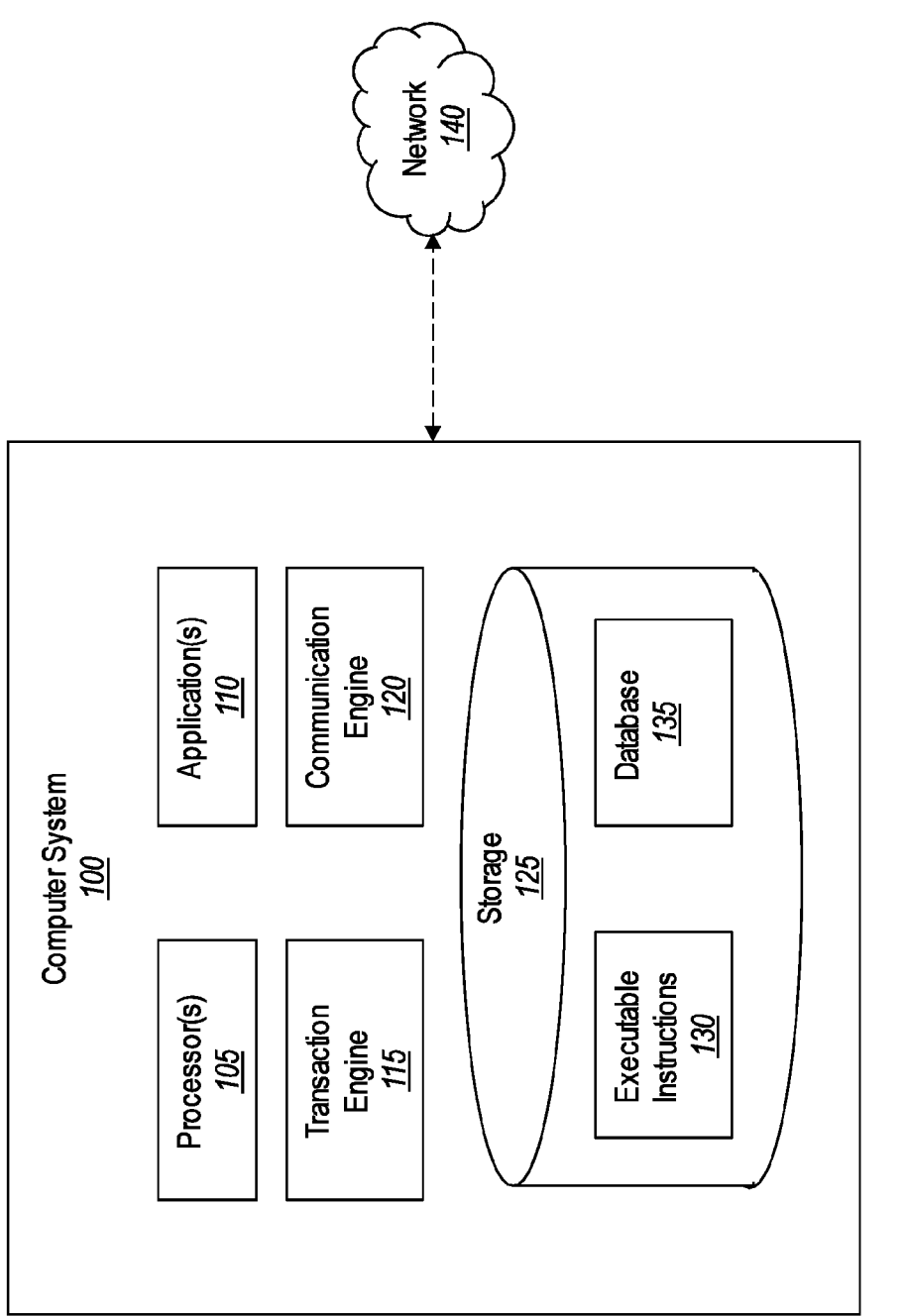
FIG. 1 illustrates an example computer system configured to perform any of the disclosed operations.

Having just described the various features and functionalities of some of the disclosed embodiments at a high level, attention will now be directed to FIG. 1 which shows an example computer system capable of performing any of the disclosed operations. Following that discussion, the disclosure will turn to FIG. 2 which presents an example method for creating and controlling transaction keys. Then, FIGS. 3 through 9 will be discussed. These figures present various architectures and supporting illustrations on how some of the embodiments create and control the transaction keys. Next, the disclosure will turn to FIGS. 10 and 11 which demonstrate additional methods that may be performed when controlling transaction keys. Finally, the disclosure will turn to FIGS. 12 through 28 which illustrate some practical examples of how the embodiments may be practiced.

Example Computer System

FIG. 1 illustrates an example computer system 100 that may be used to facilitate the operations described herein. The computer system 100 may take various different forms. For example, the computer system 100 may be embodied as a server, a distributed system, a desktop, laptop, a mobile phone, a data center, and/or any other computing device.

In its most basic configuration, computer system 100 includes various different components. For example, FIG. 1 shows that computer system 100 includes at least one processor 105 (aka a "hardware processing unit"), application(s) 110, transaction engine 115, communication engine 120, and storage 125, which may include executable instructions 130 and a database 135. The processor 105 may be configured to perform any of the method acts that will be discussed later. Although not shown, the computer system 100 may include ASICs, GPUs, or other types of hardware logic units.

The storage 125 may be physical system memory, which may be volatile, non-volatile, or some combination of the two. The term "memory" may also be used herein to refer to non-volatile mass storage such as physical storage media. If the computer system 100 is distributed, the processing, memory, and/or storage capability may be distributed as well. As used herein, the term "executable module," "executable component," or even "component" can refer to software objects, routines, or methods that may be executed on the computer system 100. The different components, modules, engines, and services described herein may be implemented as objects or processors that execute on the computer system 100 (e.g. as separate threads).

The disclosed embodiments may comprise or utilize a special-purpose or general-purpose computer including computer hardware, such as, for example, one or more processors (such the processor 105) and system memory (such as storage 125), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 100 may also be connected (via a wired or wireless connection) to external sensors (e.g., one or more remote cameras, accelerometers, gyroscopes, acoustic sensors, magnetometers, data acquisition devices, etc.). Further, the computer system 100 may also be connected through one or more wired or wireless networks 140 to remote systems(s) that are configured to perform any of the processing described with regard to computer system 100. The computer system may also include a graphics rendering engine that is configured, with the processor 105, to render one or more user interface elements on a display.

A "network," like the network 140 shown in FIG. 1, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 100 will include one or more communication channels that are used to communicate with the network 140. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 105). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

Example Methods

Attention will now be directed to FIG. 2 which refers to a number of method acts that may be performed. Although the method acts may be discussed in a certain order or illustrated in a flowchart as occurring in a particular order, no particular ordering is required unless specifically stated, or required because an act is dependent on another act being completed prior to the act being performed.

FIG. 2 shows a flowchart 200 of an example method for creating and controlling a transaction or a transaction key/authorization record in a dynamic and/or real-time manner. By real-time, it is meant that these processes may be performed essentially contemporaneously with when certain triggering actions are performed (e.g., receipt of pending or "live" data). In other words, these operations occur as needed or as prompted and may occur at any time of day or anywhere in the world. This particular method is from the viewpoint of a server (e.g., a cloud-based or otherwise remote server). Some of the later methods (e.g., the methods described in connection with FIGS. 10 and 11) are from other viewpoints. At a high level, this method relates to various processes that may be performed in order to determine whether a requesting user device is permitted to engage or initiate the performance of a particular transaction. Examples of this transaction include, but are not limited to, providing goods or services to a user device, providing financial data (e.g., money) to another user, permitting entry through a physical barrier, or even permitting receipt of data extracted from a user's account.

As a general matter, a first device sets of a code and certain parameters that must be satisfied in order for the transaction to occur. This code and the parameters are maintained in a separate server. In some instances, the parameters include an authorized quantity of the goods or services that are to be provided to the other user device. Once this initial registration or initialization phase is complete, then the authorization code may be shared with any number of other users. If those users adequately satisfy the parameters (and submit the correct authorization code), then those users may be permitted to be a part of the transaction. If not, then they are denied access. Accordingly, the following method acts more fully detail these high level processes.

Initially, there is an act (act 205) of identifying an authorization code that is associated with a first user device that is in communication with the server. In some instances, the authorization code is received from the first user device while in other instances the code is generated at the server but is connected (or has a defined relationship) with the first user device. This authorization code is useful because it enables other user devices (e.g., a second user device) to initiate the execution of a subsequent transaction, which will be described in more detail later. As such, when the authorization code is received (at the server) from a second user device, the code can trigger the server to determine whether to authorize execution of a subsequent transaction for the second user device. In this manner, the server acts as an authorization-granting entity, and the authorization code acts as an initial key for that authorization.

After the authorization code is identified, but before the authorization code is received from the second user device, a set parameters (e.g., any number of parameters are available) that are associated with the subsequent transaction are identified (act 210). In some instances, the parameters correspond to input entered at the first user device (e.g., the user entered certain requirements at a user interface of the first user device). These parameters at least partially define various different requirements that must be satisfied by the second user device in order to trigger the execution of the subsequent transaction. Consequently, the execution of the subsequent transaction is dependent on both receipt of the authorization code from the second user device and satisfaction of the set of one or more parameters by the second user device.

Thereafter, there is an act (act 215) of generating and storing an authorization record for the subsequent transaction. This record is stored at the server and includes both the authorization code and the set of one or more parameters. In this manner, the authorization code is generated first, then the parameters, and then the record. Accordingly, the record bundles both the code and the parameters together into a single data structure. This bundle may be stored in a database or any type of filesystem and can be queried or otherwise searched.

After the authorization record is generated, a transaction request is received (act 220) from the second user device. In this manner, the second device is now requesting permission for the subsequent transaction to be executed. Notably, the transaction request includes both the authorization code and certain identified attributes of the second user device. These attributes will be used to determine whether the second user device adequately satisfies the parameters.

The last illustrated act is an act of granting or denying authorization (act 225). For example, upon determining that the second user device's identified attributes satisfy the parameters, then the server will generate an authorization for the subsequent transaction. Alternatively, upon determining that the second user device's identified attributes do not satisfy the parameters, then the server will refrain from generating the authorization for the subsequent transaction.

Systems for Authorizing a Transaction

Figure 3:
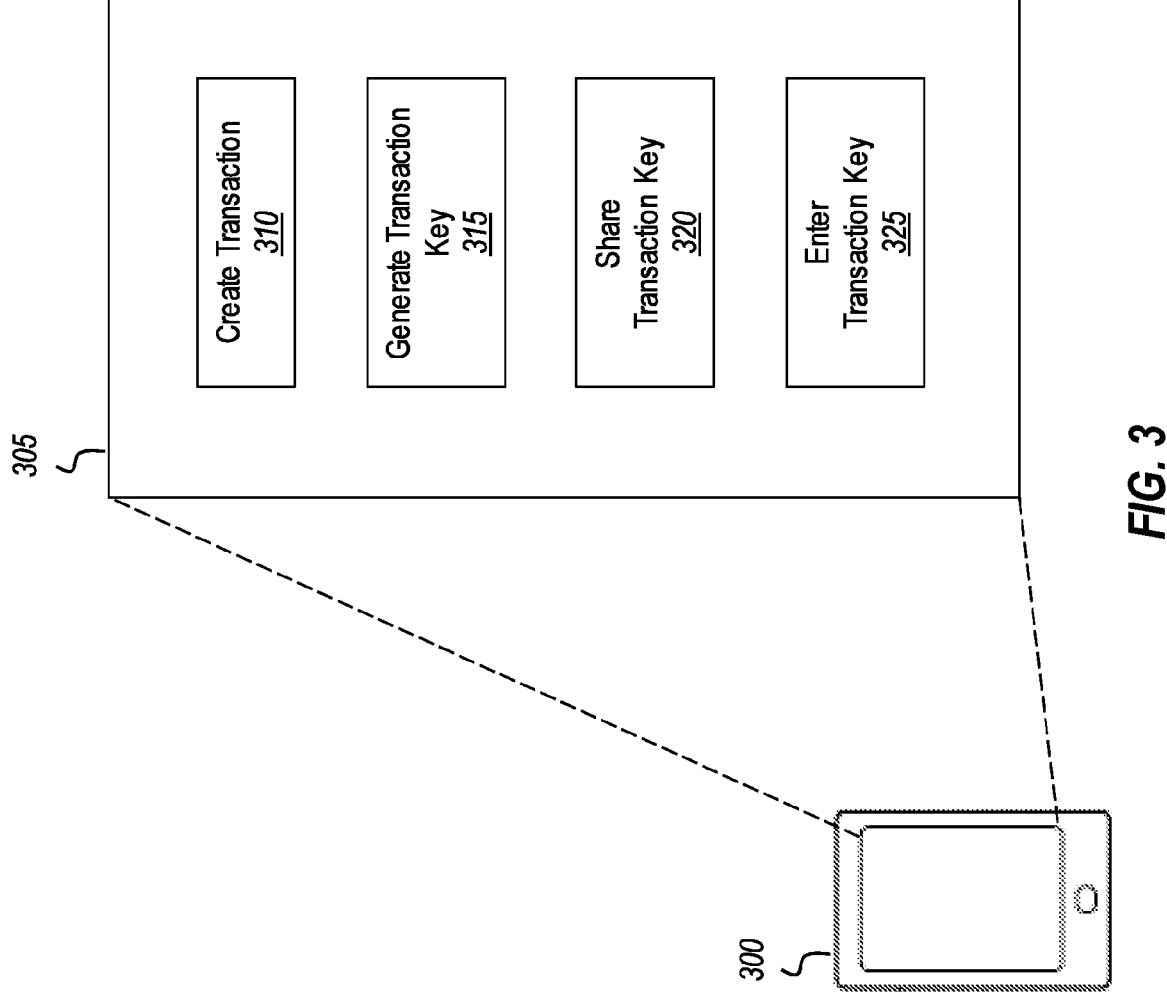
FIG. 3 illustrates an example of a user device that may be used to define an authorization code as well as a set of parameters in order to ensure that only authorized devices are able to participate in a subsequent transaction.

Having just described some of the processes and techniques for creating and controlling an authorization code, attention will now be directed to FIGS. 3 through 9 which illustrate various architectures and supporting illustrations regarding how these techniques may be implemented. FIG. 3 shows a user device 300. User device 300 may be an example implementation of the computer system 100 from FIG. 1 such that it may perform any of the functionalities discussed earlier.

The disclosed embodiments generally relate to methods and systems for the controlled triggering of a security-sensitive action. Security-sensitive actions include, but are not limited to, actions such as locking and unlocking doors, granting and revoking access to electronic documents, and even withdrawing funds from an account and depositing those funds into a different account. To facilitate any of those operations, user device 300 may be configured to store or warehouse different kinds of information, including an interface with information 305. Here, information 305 is usable to enable a user of user device 300 to initiate the terms of a transaction and to control who is permitted to engage in that transaction.

For instance, information 305 includes a create transaction option 310. This option, as well as the other information 305 can be presented as user interface objects which, when selected, trigger the functionality attributed to the corresponding option. The create transaction option 310, for example, when selected enables the user to define some of the basic terms of the subsequent transaction. For instance, in the context of unlocking a physical barrier, create transaction option 310 may present the user with selectable options to delineate which specific barrier is to be unlocked. Alternatively, in the context of a financial transaction, create transaction option 310, when selected, may present the user with input fields to delineate the amount of money that is involved in the transaction. Additionally, create transaction option 310 may present the user with fields or selectable options for identifying the financial institutions that are involved (e.g., the withdrawing institution and the depositing institution). In this regard, create transaction option 310 enables the user to define, through selectable/input elements of an interface, some of the most fundamental features or attributes of the transaction. These terms of the transaction are stored, in some embodiments, as some of the parameters for the transaction, as described above.

Once the terms of the transaction are defined, then it is beneficial to control which entities will have access to that transaction. For instance, if the user desires to transfer money to a particular recipient, then the user will clearly want to make sure that only the correct recipient receives the funds. In other words, the user will want to enact certain safeguards to protect the transaction. Accordingly, the generate transaction key 315 (also referred to herein as an authorization code) is used to implement safeguards on the transaction. By selecting or otherwise implementing the generate transaction key 315 option of a user interface, the user of user device 300 is able to manually enter and/or create (with automated creation scripts) an authorization code for the transaction. Additionally, the generate transaction key 315 option enables the user to define additional parameters that must exist and/or that a recipient user or user device must have in order to trigger the execution of the transaction. These features will be discussed in more detail below.

The share transaction key 320 option, when selected from an interface, enables the user to trigger the electronic transmission of the authorization code and the delineated parameters to another user device or server. For example, this transmission may occur using any kind of transmission process. Such processes include, but are not limited to, email, SMS message, near field communication, Bluetooth communication, or any other process for electronically transmitting information from one device to another.

Finally, user device 300 also presents an enter transaction key 325 option in an interface which, when selected, presents an input field for entering a transaction code. If user device 300 is on the recipient-end of a transaction, then the enter transaction key 325 option allows the user to enter an authorization code in an attempt to trigger the execution of a transaction. As such, user device 300 may not only be used to initiate a transaction, but it may also be used to engage in the transaction on the receiving-end.

Figure 4:
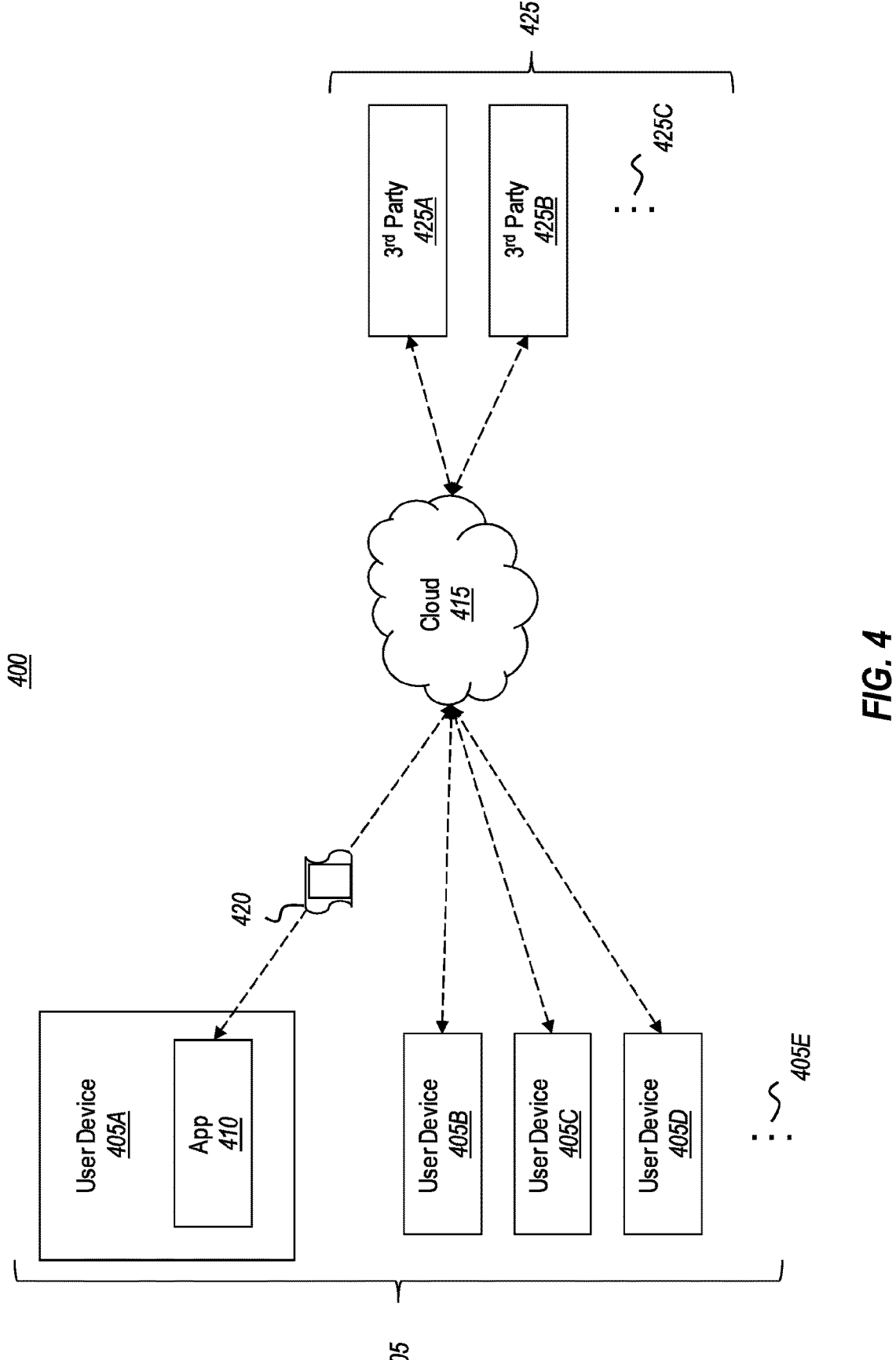
FIG. 4 illustrates a cloud environment which is configured to interact with any number of user devices in order to create and manage transaction keys.

FIG. 4 shows an architecture 400 on how some of the embodiments may be practiced. Specifically, FIG. 4 shows a number of user devices 405. User devices 405 may be example implementations of user device 300 from FIG. 3. For example, user devices 405 include user device 405A, 405B, 405C, and 405D. The ellipsis 405E demonstrates that any number of user devices may be provided. The app 410 may be an interface or other program that manages how the transaction is generated (e.g., the information 305 from FIG. 3).

The disclosed embodiments are able to interconnect any number of user devices 405 in order to facilitate the execution of a particular transaction. In some embodiments, this is achieved by connecting the user devices 405 to a cloud environment 415 and by passing messages 420 through the cloud environment 415 to one another. In addition to passing information from one user device to another, the architecture 400 is also able to connect user devices to $3^{rd}$ party entities 425. These $3^{rd}$ party entities 425 include $3^{rd}$ party entity 425A and 425B. The ellipsis 425C demonstrates that any number of $3^{rd}$ party entities may be present.

Examples of $3^{rd}$ party entities 425 include, but are not limited to, a financial institution, a garage door keycode, a door code, a safe code, a car door code, a building code, or any other type of barrier or process where access is controlled. In this regard, the architecture 400 is useful for establishing the bounds or terms of a transaction (e.g., the terms, authorization code, parameters, etc.), for transmitting that information from one device to another device, and for gauging whether the recipient device has sufficient attributes or credentials to engage in the transaction. In many instances, this transaction may include the participation of a $3^{rd}$ party entity. As an example, if the transaction is a financial transaction, then banks or other types of financial institutions will be involved. If the transaction is related to entry through a physical barrier (e.g., a garage door), then the garage's electronic keypad will be involved. Accordingly, the disclosed embodiments are able to utilize architecture 400 to create and control the management of a transaction.

Figure 5:
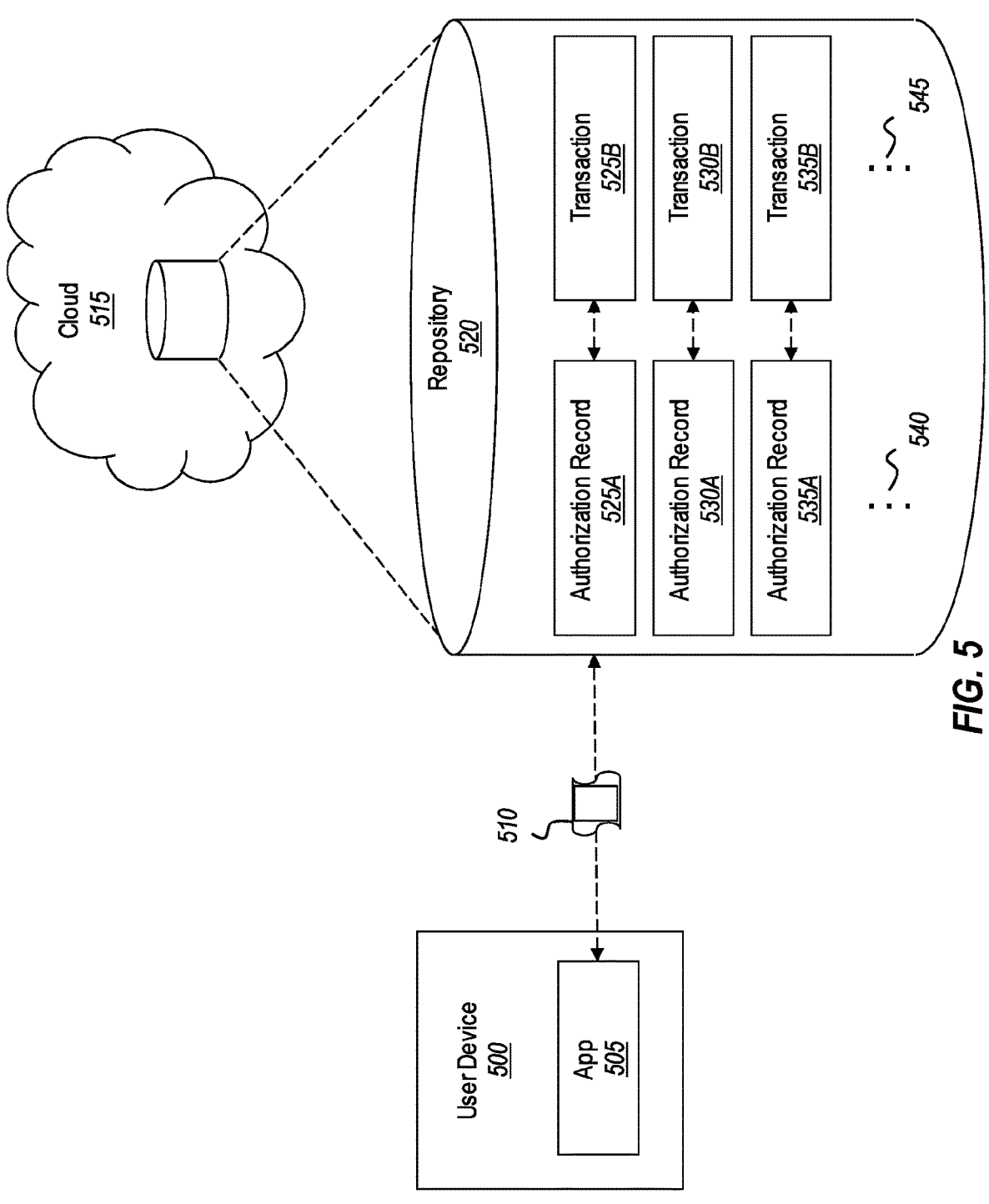
FIG. 5 illustrates how transaction keys/records are stored in a cloud environment and how those keys/records are accessible.

FIG. 5 more fully shows some of the information that may be created and stored in connection with these processes. Initially, FIG. 5 shows a user device 500 which is an example implementation of user devices 405 from FIG. 4. User device 500 includes an app 505 which is representative of the app 410.

Here, app 505 is configured to pass data 510 to the cloud 515. Specifically, app 505 communicates with a service running in the cloud 515 and which manages how transactions are performed. To do so, the service maintains a repository 520 that stores transaction information.

As discussed earlier in connection with the method presented in FIG. 2, the embodiments are able to generate an authorization record (i.e. a transaction key) and manage/store that record in the cloud 515. In this regard, data 510 may include the authorization code and the parameters that must be satisfied by a different device in order to trigger the execution of the transaction. Once the server receives the data 510 from user device 500, the server will store the data 510 in the repository 520 in the form of an authorization record. To illustrate, repository 520 includes an authorization record 525A which is linked to a particular transaction 525B. In other words, the process of generating and storing an authorization record (e.g., authorization record 525A) includes associating data of that record (e.g., an authorization code and a set of one or more parameters) with a particular transaction in a database stored on a server computer system in the cloud 515.

Here, authorization record 525A outlines the requirements that must be satisfied in order to obtain access to the transaction 525B. As will be discussed shortly, authorization record 525A includes not only an authorization code, but also a number of parameters. The authorization code serves as an initial barrier or gateway to the transaction 525B, and the parameters serve as an additional control for managing who will be able to engage or participate in the transaction 525B. Repository 520 includes any number of other authorization records and transactions. For example, authorization record 530A is linked or associated with transaction 530B, and authorization record 535A is linked with transaction 535B. The ellipsis 540 and 545 demonstrate that any number of authorization records may be linked with transactions.

Figure 6:
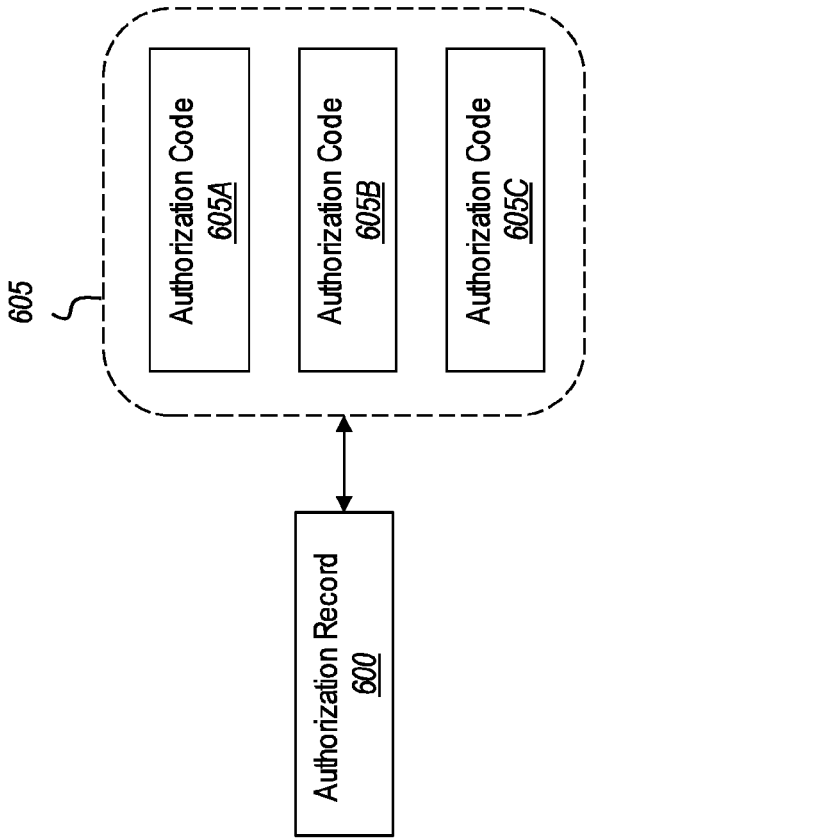
FIG. 6 shows that any number of authorization codes may be attributed with an authorization record.

FIG. 6 shows additional detail regarding a authorization record 600, which is an example implementation of the any of the authorization records discussed earlier. Here, authorization record 600 includes an authorization code 605. Authorization code 605 may actually be comprised of any number of authorization codes (e.g., authorization codes 605A, 605B, and 605C). In this regard, an authorization code may be but one of a plurality of authorization codes that are associated with are particular transaction or authorization record. As shown, each of the authorization codes is included in the authorization record 600.

As an example, consider a scenario where a user desires to allow five (5) different guests to enter the user's home, which is protected using a security code. In this example scenario, the user will create a single transaction (i.e. entry into the user's home) and will establish the terms for gaining entrance into the user's home. These terms may include an authorization code as well as the satisfaction of any number of parameters for each individual guest. If the requirements outlined in the authorization record are adequately satisfied, then the guests will be permitted to enter the user's home. In the context of a financial transaction, multiple users may be involved in this transaction. As such, an administering user may cause an authorization record to be created for that transaction. The record may delineate multiple authorization codes (one for each user) and any number of parameters. By using different authorization codes for each user, then tracking mechanisms may be used to determine which users have already engaged in the transaction and which users have not yet participated.

Alternatively, the embodiments support any desired level of anonymity in the system. In some instances, it may be desirable to not identify a user but rather to simply interact with the user in an anonymous manner. By providing an authorization code and some simple parameters, the user's identities may be kept secret and the transaction can occur discreetly.

Figure 7:
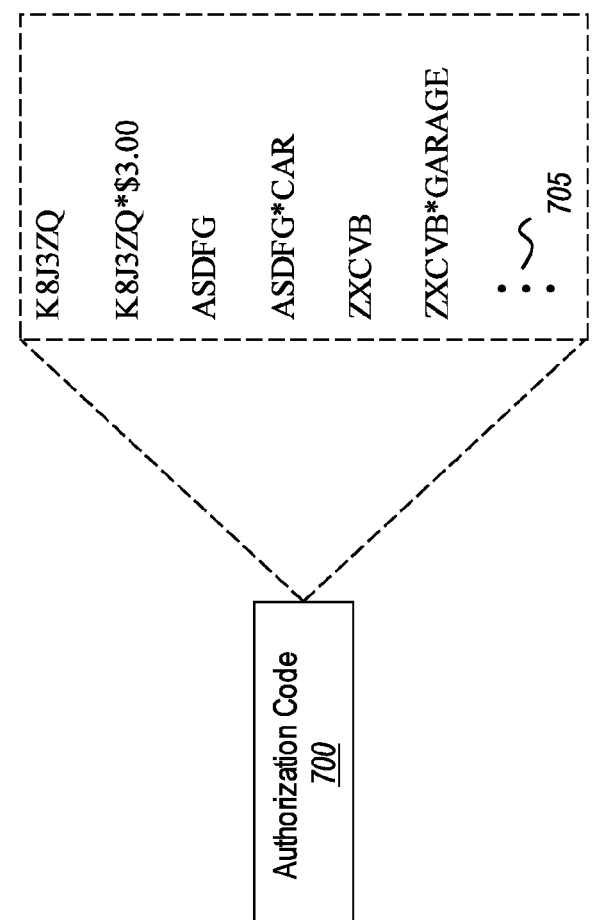
FIG. 7 shows some of the various different forms that an authorization code may have.

FIG. 7 shows an example of some of the forms that an authorization code 700 may take. It will be appreciated that these are example forms only, and that the authorization code 700 may actually take on any kind of form. In a first form, authorization code 700 may be embodied in a randomized arrangement of a series of numbers and/or letters. For example, FIG. 7 shows the authorization code 700 in the form of "K8J3ZQ." Additionally, in some embodiments, attributes of the transaction may be appended or included in the authorization code. As an example, consider a scenario where the transaction includes passing $3.00 from one user to another. If desired, the authorization code 700 may be specially tailored to include any attribute or parameter associated with the transaction. To illustrate, the authorization code 700 may take the form of "K8J3ZQ*$3.00" where the "$3.00" is representative of the amount that is involved in the financial transaction.

Similarly, the authorization code may take the form of "ASDFG" or even "ASDFG*CAR" in situations where the authorization code 700 is being used to gain entry into a user's car. Relatedly, the authorization code 700 may take the form of "ZXCVB" or "ZXCVB*GARAGE" in situations where the transaction is related to gaining entry into the user's garage. The ellipsis 705 demonstrates that any form of authorization code may be used.

Furthermore, it will be appreciated that the authorization code 700 may be just a series of numbers, a series of letters, or a series of icons and/or other string values. Furthermore, the user is able to customize the authorization code based on the type of transaction that is to occur, as described above. For example, in the case where the transaction is related to permitting access through a garage via a door code, then the authorization code will likely just be a series of numbers because most door codes include a simple numeric keypad. Accordingly, the authorization code 700 may be customized or otherwise formatted in such a manner to suit the needs of the transaction.

In some embodiments, the user generates the authorization code 700 him/herself and enters the authorization code 700 as input at his/her device. In other embodiments, however, the user's device (or the service running in the cloud) generates the authorization code 700 on the user's behalf. In this manner, the authorization code 700 may be generated by any entity. Combinations of the above are also available. For instance, the user may desire to append information to any part of the authorization code (e.g., the phrase "CAR") and may allow the remaining portions of the code to be generated by his/her device. In this manner, generating the authorization code 700 may be a hybrid process that is partially controlled by the user and partially controlled by the user's device.

Figure 8:
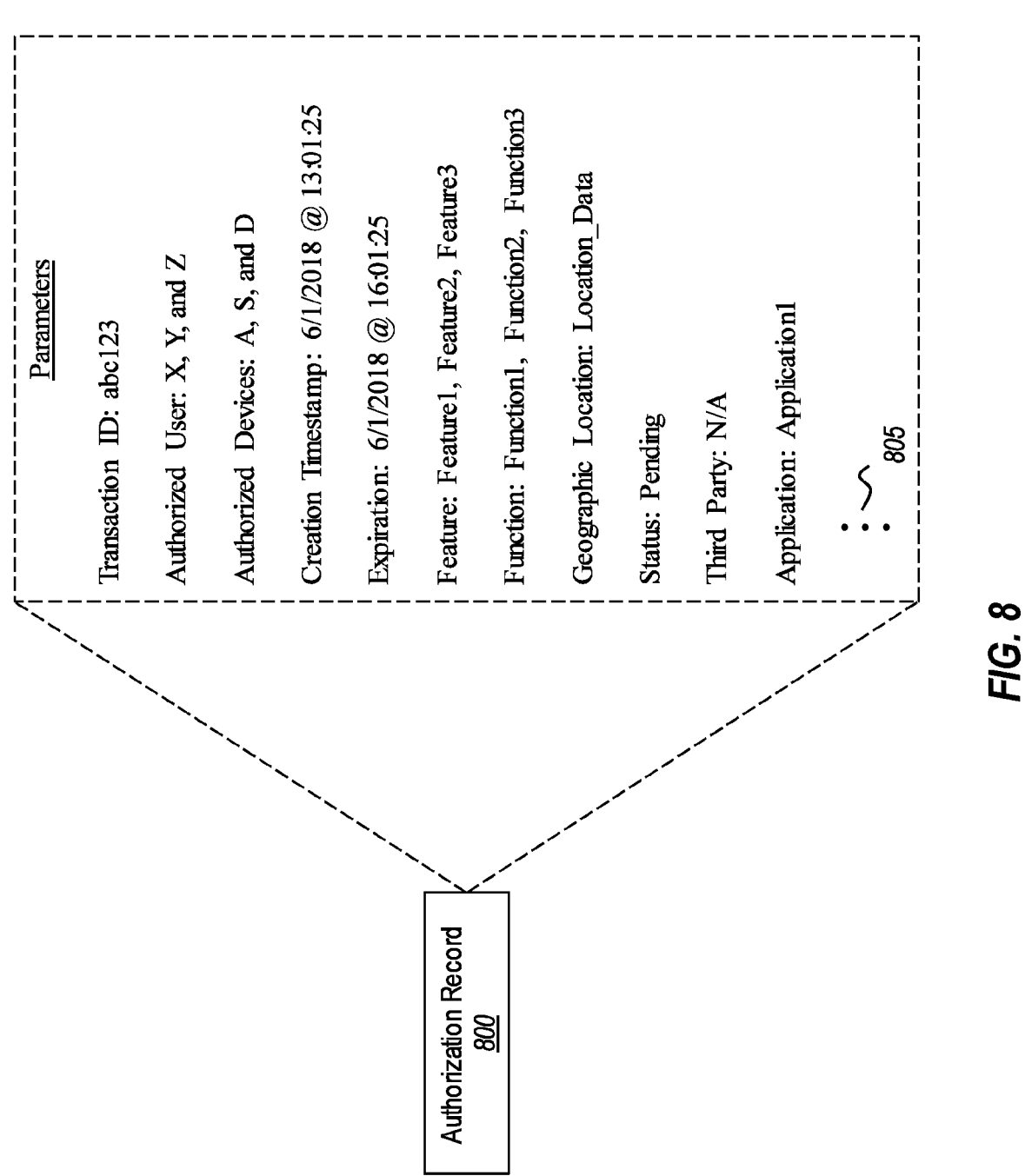
FIG. 8 illustrates some of the content that is included in an authorization record.

Attention will now be directed to FIG. 8 which illustrates additional information that may be included in an authorization record 800. As described earlier, the authorization record 800 may include not only any number of authorization codes, but it may also include any number of defined parameters, as shown in FIG. 8. For instance, the authorization record 800 includes the following parameters: a transaction ID, a list of authorized users, a list of authorized devices, a creation timestamp, an expiration time, a list of features associated with the transaction, a list of functions associated with the transaction, certain geographic data, a status indicator, a list of third parties, and a list of applications. The ellipsis 805 demonstrates that additional (or fewer) information may be included in the parameters. For example, the set of parameters may optionally define whether any particular authorization code is valid for a single invocation (i.e. use) of that code or is valid for multiple invocations. Furthermore, it will be appreciated that these parameters are just a few examples, and the embodiments should not be limited simply to that which is shown in FIG. 8.

In some embodiments, a list of selectable parameters may initially be displayed on a user interface. In this regard, a user is able to comb through the list and select any number of parameters that the user deems may be applicable to the transaction. As such, the resulting set of parameters may actually be a part of a much larger set of default parameters, and the user is able to selectively choose which parameters must be satisfied in order to execute the transaction.

Regarding the transaction ID, a unique name or identifier may be created for the transaction. In this manner, different transactions may be separated or segregated from one another, and the different authorization records may be organized to properly correspond to their respective trans-actions. The parameters may also call out which users are authorized to participate in the transaction. Such information may include, but is not limited to, a name of the user or some other kind of identifying information (e.g., a driver's license number, a social security number, a telephone number, etc.). The parameters may also delineate which devices are per-mitted to engage in the transaction. For instance, an autho-rized user may have multiple devices, but only one of which may be used to participate in the transaction. In this manner, the parameters beneficially control how the transaction will occur. Optionally, the authorized users delineation in the set of parameters may include an identification of a group of authorized devices/users or a group of authorized device types.

The creation timestamp shows the time that the transac-tion was initiated. Similarly, the expiration shows when the transaction will expire. If the transaction is not completed within the allowed time period, then the users will no longer be able to participate and the transaction will close. In this regard, the set of parameters may optionally include an expiration for the transaction and/or an authorization code such that, when the expiration occurs, the transaction and/or authorization code becomes invalid.

The features and functions parameters outline some of the different requirements that must be satisfied for the trans-action to occur. Examples include, but are not limited to, a requirement that a picture of the user be captured for documentation purposes, a requirement that a certain num-ber of users be present for the transaction, a requirement that the transaction occur at a particular location (e.g., the geographic location parameter), or any other kind of require-ment.

The status describes a state of the transaction. Status descriptors include, but are not limited to, created (when a transaction is first created), activated (when a transaction is available to be performed), pending (when the transaction is currently being executed), completed (when the transaction is finalized), expired (when the time requirements for the transaction have elapsed), void (when the transaction is no longer available), and other transaction-specific identifiers. For example, if the transaction is a financial transaction, then the status may be "deposited" to represent that funds have been transferred. If the transaction is related to entry into a physical barrier, then the status may be "used" to represent that they keycode has been used. In this manner, the status may include general indicators, or it may include transac-tion-specific identifiers.

The third party parameter may delineate the identity of the third party that is involved in the transaction. To illustrate, the third party parameter may indicate the names of the financial institutions, the account numbers of those financial institutions, the name of the security agency protecting a house, the name of the security agency protecting a building, or any other third party entity that is a part of the transaction. Similarly, the application parameter may list the names of the applications that are involved in the transaction. As an example, if the transaction is an online transaction, then the application may be a particular online application or service running in the cloud.

Additionally, or alternatively, the parameters may include one or more of the following: (1) an identification of one or more authorized geographic regions where a transaction request is required to originate from, (2) an identification of an authorized device or device type, or (3) an identification of an authorized user or user type. Of course, it will be appreciated that the parameters may control or be applicable only to an individual user, or they may control a group of users. Therefore, the parameters may be specially tailored based on the specific use scenario of the transaction.

In some embodiments, the parameters include a depen-dency on a detected response in one or more social media platforms. For instance, the detected response may include identifying a number of positive (e.g., a "like") or negative reactions for the pending transaction in a social media page or platform. If the number of reactions reaches a threshold number or level, then the pending transaction may proceed, or it may be cancelled. As an example, consider a scenario where the transaction is published or otherwise made known to one or more users on a social media platform. In addition to requiring that the authorization code be validly presented, the parameters may also specify that a certain number of likes must occur in order for the transaction to proceed. In this manner, determining whether to execute the transaction is based at least in part on the authorization code as well as the positive or negative response from the social media. As such, some of the parameters may be beyond the control of the requesting entity. Rather, some parameters may be based on a factor that is uncontrolled or uninfluenced by that requesting entity and that is, instead, influenced by a poten-tially large number of other users (e.g., the collective response or will of a group of unbiased, independent enti-ties). Additionally, in some embodiments, there may be a waiting period associated with the parameters in order to give a sufficient amount of time for those unbiased external users to adequately react to the transaction, or rather, to allow a sufficient or threshold number of users to react.

Another parameter may refer to a number of times that a user may incorrectly attempt to enter the authorization code. For instance, the parameters may include a stipulation that a user is allowed only a threshold number (e.g., 3, 4, 5, 6, or any number) of failed attempts before that user is barred from making further attempts. This barring action may be permanent or it may occur only for a preselected duration of time. In this manner, the code space/transaction is protected by limiting the number of authorization codes any user can present incorrectly. To monitor the number of attempts, some embodiments associate a failed attempt counter with each user and then increment the corresponding counter when a user fails to enter the authorization code correctly.

It will be appreciated that these parameters are highly modifiable/adjustable. For example, even though the param-eters may be defined to have initial values, these values are adjustable even after the authorization record is generated and stored. As such, a user is able to retain control over how the transaction is to occur and is not bound to the parameters that were initially defined.

Figure 9:
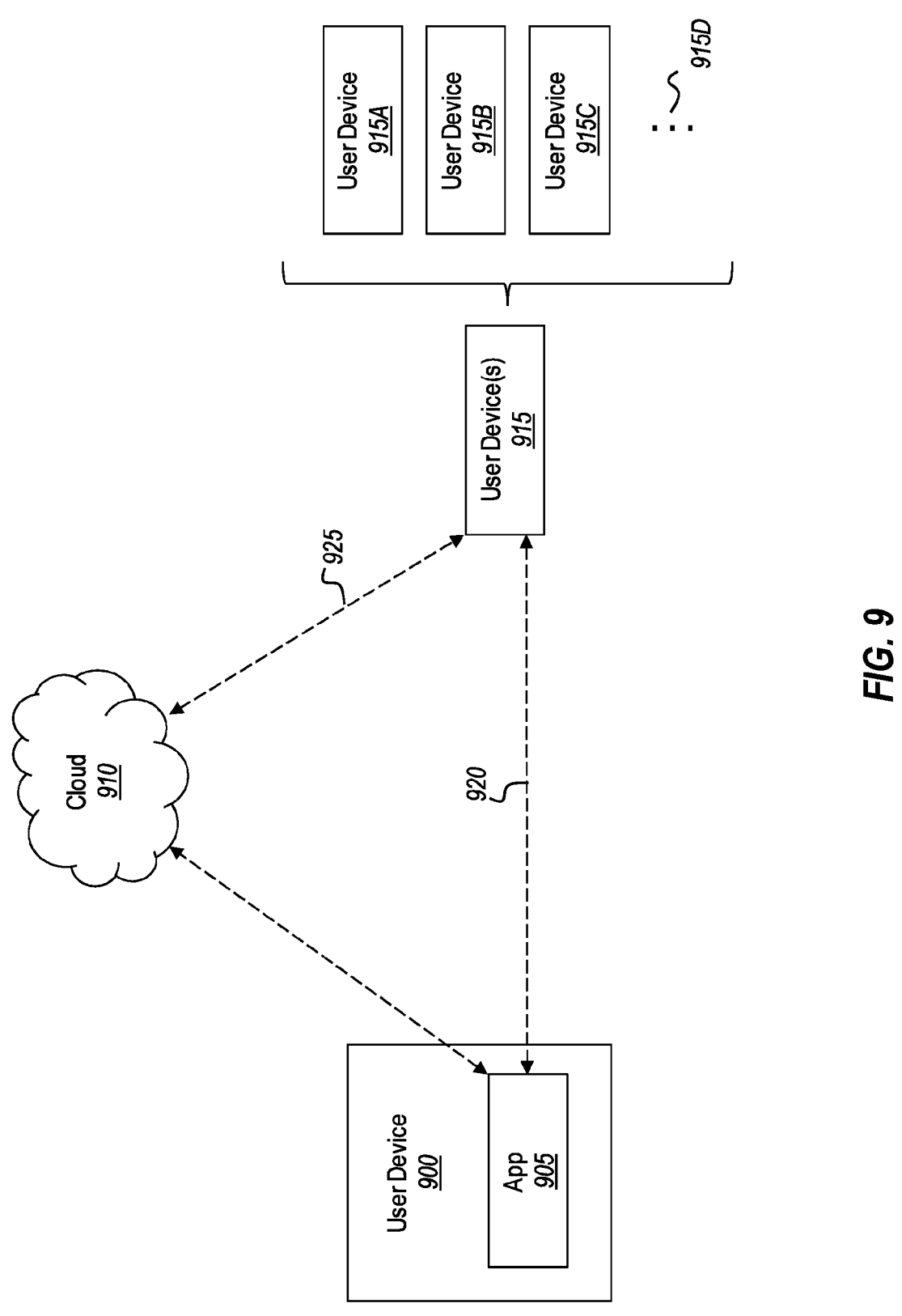
FIG. 9 illustrates how multiple devices are in communication in order to grant permission to execute a particular transaction.

FIG. 9 shows that multiple user devices may be connected in a variety of different ways in order to practice the disclosed embodiments. For example, FIG. 9 shows a user device 900 with its associated app 905, a cloud environment 910, and another user device(s) 915. As described earlier, user device(s) 915 may include any number of user devices (e.g., user device(s) 915A, 915B, 915C, with the ellipsis 915D showing that more or fewer may be present). In some embodiments user device 900 is able to directly interact or communicate 920 with user device(s) 915. In other embodiments, user device 900 uses the cloud 910 to communicate with user device(s) 915 via networked communications 925. In some circumstances, an authorization code is electronically received from another user device while in other circumstances the authorization code is entered manually by a user.

It will also be appreciated that a recipient device (e.g., user device(s) 915) need not download the same app 905 as the submitting device (e.g., user device 900). For instance, even though user device 900 uses app 905 to initiate the formation of a transaction, user device(s) 915 is not required to use the same app 905 in order to engage in that transaction. To clarify, app 905 may be used to specify the terms of the transaction, but the transaction may actually occur using a different application or program. As an example, consider a financial transaction. The app 905 may specify the parameters that must be satisfied to allow the execution of the transaction, but the actual transaction may occur using a financial institution's application (which may be separate from app 905). In this regard, the user of user device(s) 915 can navigate directly to the financial institution's application without ever having to download or execute app 905, which was used to define the terms of the transaction. Accordingly, the disclosed embodiments provide many benefits because users will not be burdened with having to download additional applications.

As described earlier, the user device(s) 915 are able to submit a transaction request in an attempt to trigger the execution of a particular transaction. This transaction request will typically include the authorization code as well as various attributes of the user or the user's device. By transmitting this information to the cloud 910, the server running in the cloud will be able to determine whether the user device(s) 915 are permitted to participate in the transaction (e.g., by comparing and contrasting the user device's attributes against the defined parameters).

In some embodiments, the transaction request is but one of a plurality of transaction requests that are each received from a differ user device but that each correspond to the subsequent transaction. For example, user device 915A, user device 915B, and user device 915C may all attempt to participate in the transaction. Consequently, each of these devices may submit a transaction request. In some instances, user device 915B's transaction request may be authorized by the server computer system (e.g., because that device's attributes adequately satisfied the defined parameters) while user device 915C's transaction request may not be authorized by the server computer system (e.g., because that device's attributes did not satisfy the parameters). In this regard, the execution of the subsequent transaction is triggerable through use of multiple authorization codes.

Alternative Viewpoints

Attention will now be directed to FIGS. 10 and 11 which describe some different viewpoints regarding how some of the embodiments may be implemented. In particular, FIG. 10 describes a flowchart of method acts from the viewpoint of a user device that is being used to set up a transaction while FIG. 11 describes a flowchart of method acts from the viewpoint of a user device that is attempting to participate in the transaction.

Specifically, FIG. 10 presents a flowchart 1000 of another example method for creating and controlling a transaction key. In contrast to the method of FIG. 2, which was presented from the point of view of a server, the method of FIG. 10 is from the point of view of a first user device which is being used to initialize the authorization code and parameters that must be satisfied in order to authorize the execution of the subsequent transaction.

Initially, first input is received at the user device (act 1005). This input includes an authorization code. As described, when this code is received at the remote server (but from a second user device), then the code will cause the remote server to determine whether to authorize the execution of a subsequent transaction.

Next, the authorization code is submitted to the remote server (act 1010). Notably, the authorization code has been configured so that the service can include it in an authorization record that is created at the remote server and that is based on the authorization code.

Second input is then received (act 1015). This second input defines a set of parameters (one or more) that must be satisfied by the second user device in order to trigger the execution of the subsequent transaction. In this regard, the execution of the subsequent transaction is dependent on both receipt of the authorization code from the second user device and satisfaction of the set of one or more parameters by the second user device.

Finally, the set of parameters are then submitted to the remote server (act 1020). Similar to the authorization code, these parameters are also configured in a manner such that, when received by the remote server, the parameters can be linked to the authorization code in the authorization record.

FIG. 11 illustrates another flowchart 1100 of an example method for controlling transaction keys. This method, however, is from the viewpoint of a user device that is requesting for the transaction to be executed (i.e. a requesting user device).

Initially, input is received (act 1105). This input includes an authorization code that was either received from another user or that was received from a user's device. When this code is sent to the remote server (from the requesting user device), the authorization code will cause the remote server to determine whether a set of one or more parameters associated with the authorization code are satisfied based on one or more attributes of the requesting user device. In other words, and as described earlier, the server maintains a number of parameters that must be satisfied by the requesting device in order to initiate the execution of the transaction.

Next, various attributes of the requesting user device are then determined (act 1110). For example, the attributes may include any one or combination of the following: (1) a determined user identity of a user who is using the requesting user device, (2) a determined device type of the requesting user device, (3) an identification of a current geographic location of the requesting user device, or (4) a digital image of the user.

The authorization code and the one or more attributes of the requesting user device are then submitted to the remote server (act 1115). Finally, an indication is received (act 1120) from the remote server regarding whether the subsequent transaction is authorized for execution. Specifically, the subsequent transaction will be authorized for execution when the one or more parameters associated with the authorization code are satisfied by the one or more attributes of the requesting user device. In contrast, however, the subsequent transaction will not be authorized for execution when the one or more parameters are not satisfied by the one or more attributes of the requesting user device. In this manner, the embodiments are able to control which entities are allowed to be a part of the transaction.

Example Use Cases

Figure 12:
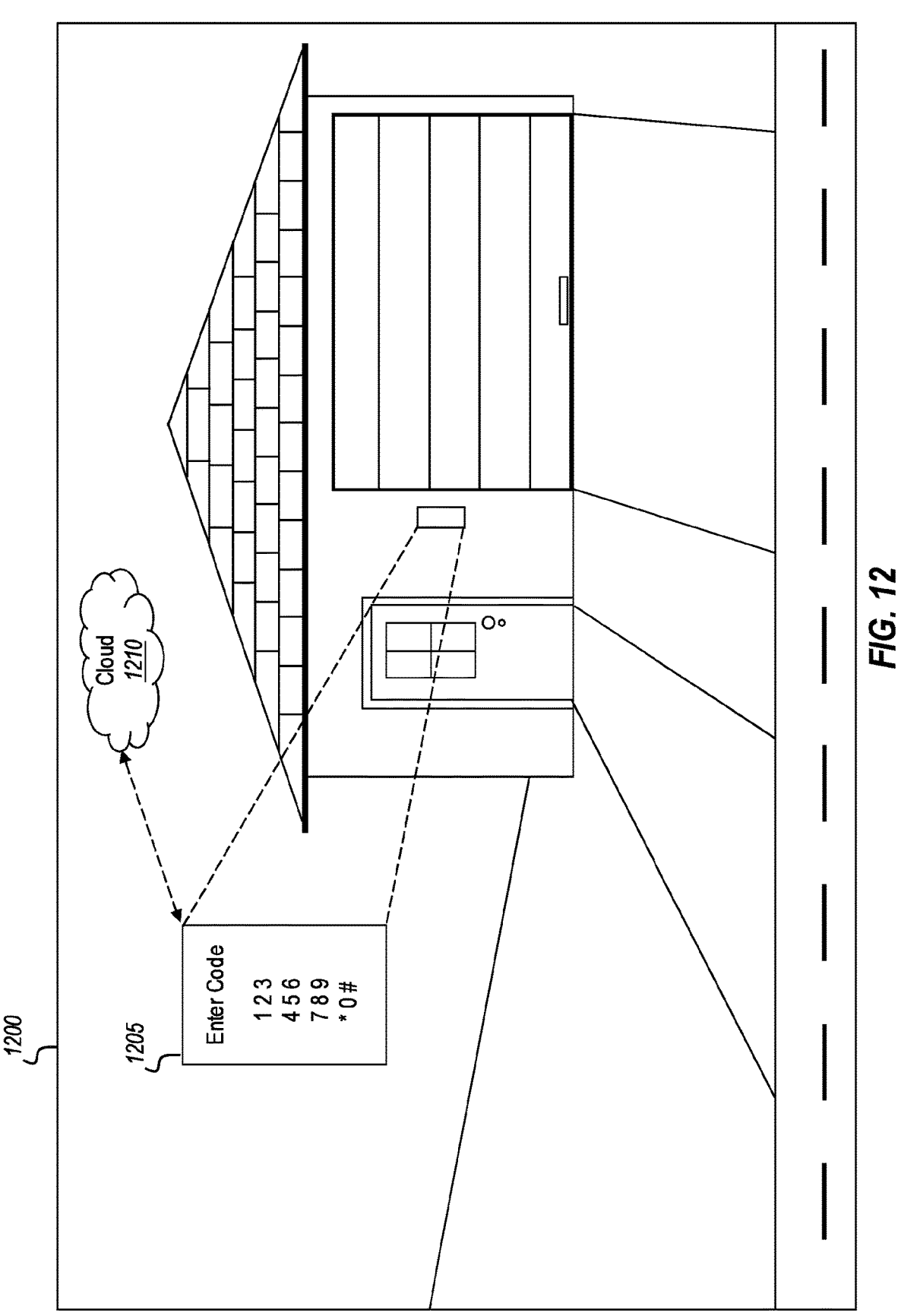
FIG. 12 illustrates an example of a real-world use case of how the embodiments may be practiced in order to gain entry through a physical barrier.
Figure 13:
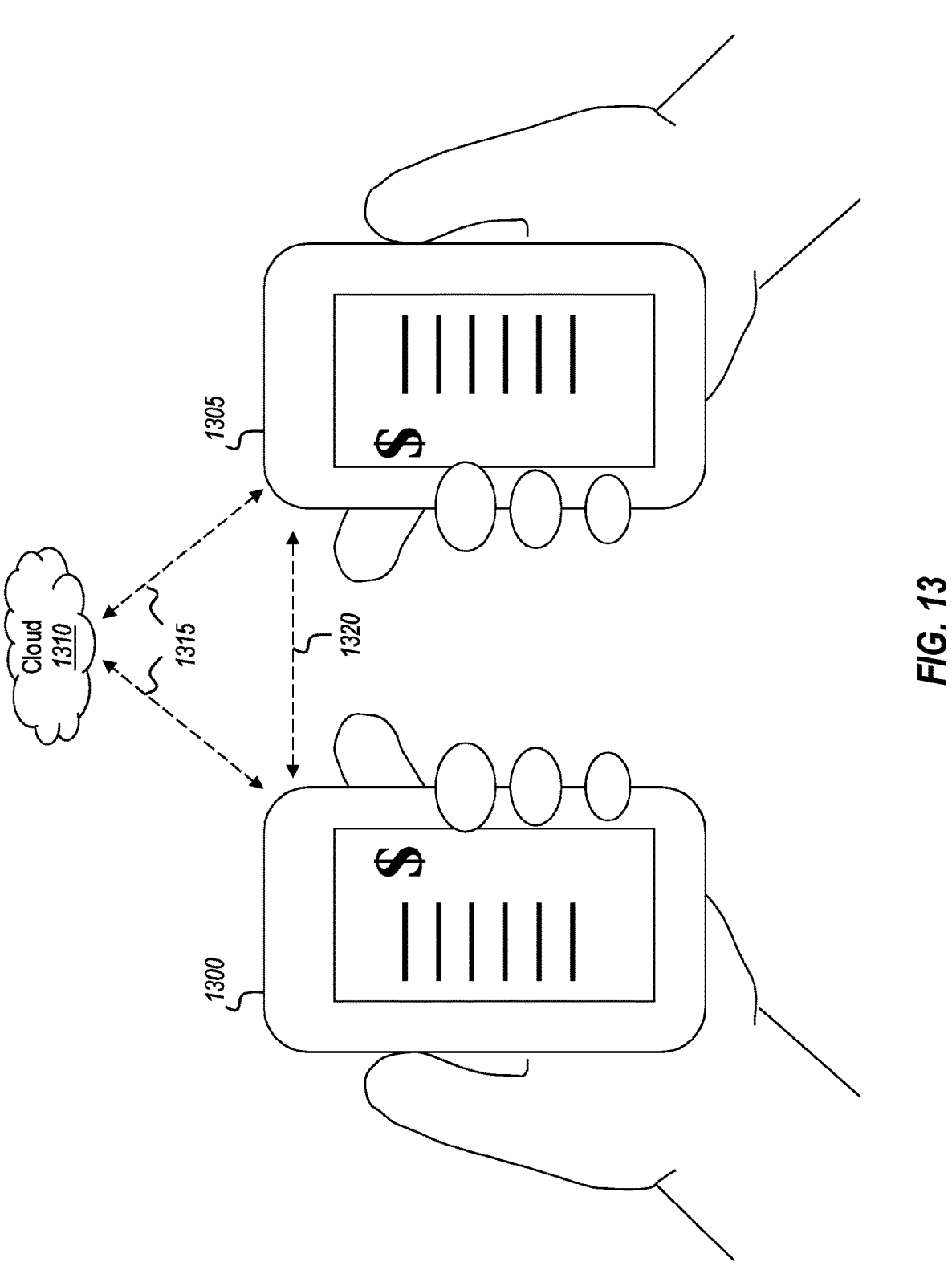
FIG. 13 illustrates another real-world example in which a financial operation or transaction is being performed.

Attention will now be directed to FIGS. 12 and 13 which illustrate some example use scenarios in which the embodiments may be practiced. For example, FIG. 12 shows an environment 1200 that includes a keypad 1205 to a person's home. This keypad 1205 may be an Internet of Things (IoT) device such that it may communicate with the cloud 1210. In any event, in some circumstances, the home owner may desire a guest to use the keypad 1205 so that the guest can enter the home. By following the principles disclosed herein, the homeowner is able to establish a transaction, along with an authorization code (e.g., perhaps the key code for the garage) as well as certain parameters for that transaction (e.g., the key code will work only during a designated time period). Furthermore, as described earlier, these parameters are adjustable. For example, if the guest is running late and the transactions expiration period elapses, then the homeowner can adjust the parameters.

FIG. 13 shows another example which relates to a financial transaction. Specifically, FIG. 13 shows a user device 1300 and a user device 1305. These devices may communicate 1315 via the cloud 1310 or they may communicate 1320 directly. In any event, user device 1300 is able to create the terms of a transaction and enable user device 1305 to participate in that transaction. Accordingly, the following discussion relates to techniques for facilitating a financial transaction.

One way to withdraw money from a bank account is to use an automated teller machine ("ATM"). ATMs dispense cash. For an ATM to be stocked with banknotes is an expensive and time-consuming process. Failure to replenish an ATM results in bank customer dissatisfaction for not being able to access the money in their accounts. Replenishing an ATM too often on the other hand drives up the expense for the bank or operator of making an ATM available. Obtaining banknotes when needed is cumbersome and time consuming. When accessing cash, a person has to find an ATM, go to the ATM, press buttons and wait for banknotes to come out. The account may have policies associated with it to limit the amount of cash that can be withdrawn in a given day.

Another way to withdraw money is to write a check made out to someone or left blank for the recipient to fill in. More and more people have been writing bad checks and so people are not accepting checks from people they do not know. The recipient of a check does not have a way to validate the received check. The check can be deposited by the recipient into the recipient's bank account using an ATM or a bank teller. A bad check results in a bounced check bank fee for the recipient. A person who writes a check and does not have enough money in their account to cover the check gets a penalty for overdrawing their account. These are bank policies.

Another way to withdraw money, give money to another person, and deposit money today is to use a payment service, for example Venmo, PayPal, Apple Pay, Google Pay, or similar service in other countries. In such systems, one person paying another electronically so far has required the paying party to identify the paid party. The giver needs to identify the receiver. Existing electronic banking and financial electronic transaction processing systems require that a recipient be identified at the time of a transaction by a payer. These electronic services have many benefits, however they lack the properties of cash.

The giving of money to a recipient anonymous to the payer is made difficult by a number of electronic system constraints in current services. First, the payer needs to identify the recipient to a payment system in such a way as to enable that payment system to transfer money to that identified recipient. Second, the recipient has to be known to the payment system used by the payer in order for that payment system to deliver money to the account of the recipient. In other words, the payment system has to know the account to credit as well as the one to debit. Thirdly, generally, the recipient and payer are made known to one another by the payment system. Usually, in a statement from the bank or payment processor, the recipient sees that a payment was made by a payer. The payer similarly sees a transaction record that payment was made to an identified recipient.

Where the word "database" is used, a distributed ledger could be used. The term "database" may be interpreted as a table in a database or a collection of records. The idea is that there is persistent storage of records with a way to query the datastore to retrieve specific records.

In some embodiments, the disclosed architectures are known as messaging architectures. An electronic message is created and sent over an electronic network, at times using the Internet (e.g., via cloud 1310), to trigger each of the transformations in the system. The system is an assembled set of elements which process electronic messages. A device generates an electronic message with specific content to control the execution of a specific element of the system. Each element of the system has an electronic trigger comprising a combination of electronic switches representing a specific sequence of alphanumeric characters, which represent a cloud function. Each such cloud function, when invoked, results in the execution of computer instructions which perform a computation, result in the storage of information in database the generation of an electronic message with content appropriate for communicating information pertinent to the next operation to be performed by another cloud function. The content of each such electronic message is communicated across an electronic network such as the Internet using voltage levels and electronic signaling encoding a representation of the data contained in each such message. Subsystems of the overall system communicate by way of an electronic triggering of a set of network connections and using a message protocol, for example, the standard TCP/IP to invoke software running on virtual servers carrying out the computations for each subsystem element of the invention. The distributed nature of the software and physical hardware to operate the system renders the system overall far more secure and resilient to malicious attacks and is fundamental the security and utility of the system.

Figure 14:
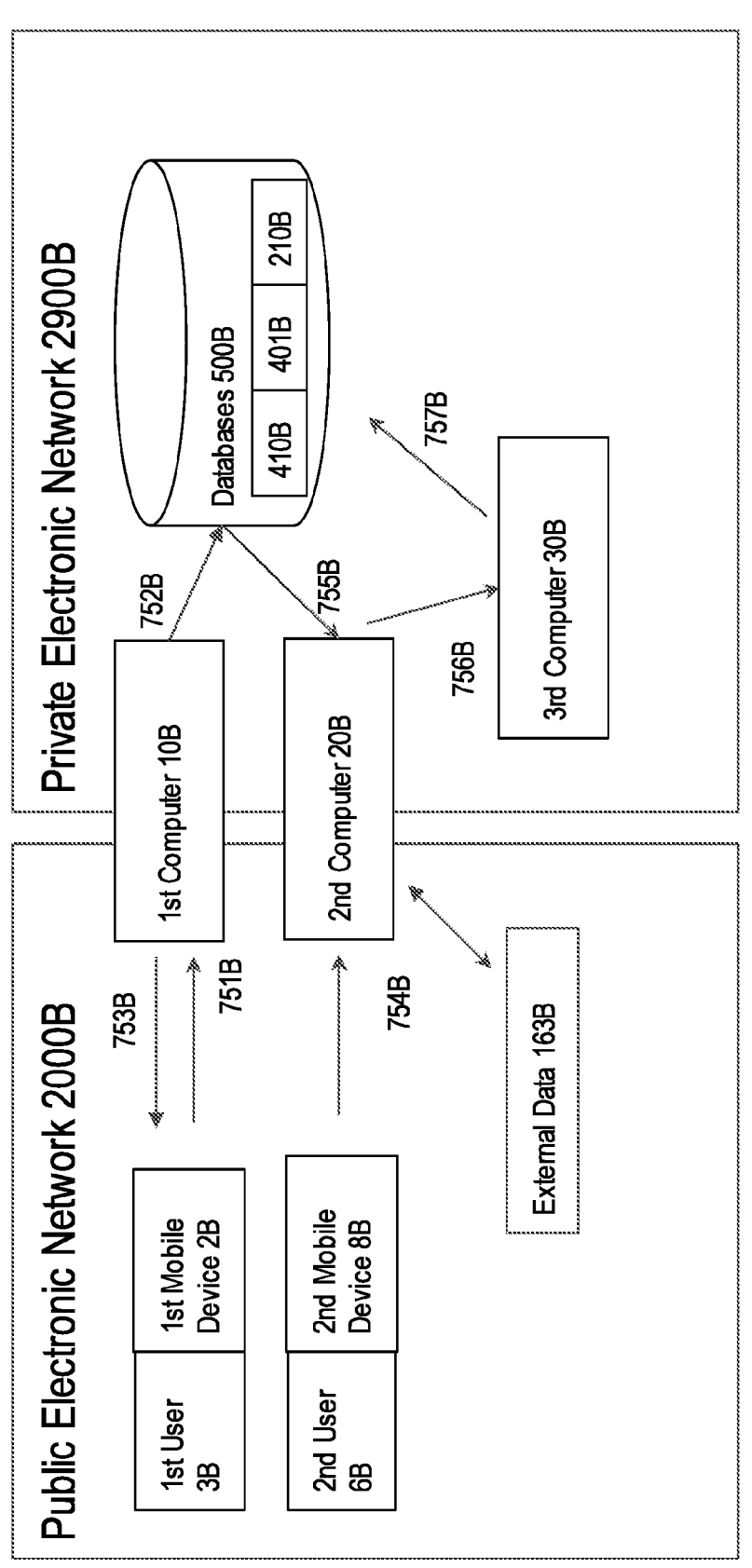
FIG. 14 depicts a schematic of the system with the flow of internal and external data and signals in the system.

FIG. 14 shows a first computer 10B is shown coupled to a private network 2900B and/or to a public electronic network 2000B, which for practical purposes is the Internet and will interchangeably be called Internet 2000B. There is a second computer 20B (e.g., user device 1305) coupled to the public network 2000B and to the private network 2900B. There is a datastore 500B coupled to the private network 2900B. There is a third computer 30B coupled to the private network 2900B. The first 10B, second 20B, and third 30B computers are able to access the datastore 500B and the private network 2900B. The third computer 30B is not accessible from the public network 2000B.

The first, second, and third computers have distinct roles. The first computer 10B sets up a transaction. The second computer 20B conditionally triggers the execution of that previously set up transaction. The third computer 30B executes the previously set up transaction.

The job of the first computer 10B is to set up a stored procedure 410B to be run by the third computer 30B. The first computer 10B has an API 701B to create and store a procedure 410B for future execution. The API also takes inputs 120B, 130B, 10B to fence the conditions of the triggering of the stored procedure 410B. In some embodiments, a time period 130B and a geographic area specification 120B in the form of a latitude and longitude and a radius in meters is accepted by the first computer 10B API 701B. The API 701B parameters are used to generate a context record 210B. The first computer 10B receives message 751B from a first user 3B using a first mobile device 2B. In response, the first computer 10B creates a stored procedure 410B to perform a specific action. Using message 752B, this procedure 410B is stored in a datastore of stored procedures 500B. The action is protected and in a parameterized template form. The first computer 10B creates an instance of the procedure 410B per message 751B received by the first computer 10B. In the preferred embodiment, the procedure 410B is implemented as a cloud function 700B, for example on Google Cloud Platform 799B. The URL for the procedure 410B is stored in the database 500B in an authorization record 401B. An action key 50B that can be used to look up the stored procedure 410B is created. The context record 210B is associated with the action key 50B. The context record 210B specifies the context in which the action key 50B is valid for triggering the stored procedure 410B. The context includes a time period 130B, a geographic area 120B, and other constraint specifications 10B, which can include, for example, the outside temperature at a given location, the result of a sports match, the current price of a particular stock, or any other external data 13B that can be queried using the public network and a search service. With message 752B the stored procedure 410B and context record 210B are stored in the database 500B. The action key is returned in message 753B by the first computer 10B to the first device 2B. The first device 2B displays the action key 50B to the user 2B in user interface 100B.

The second computer 20B receives message 754B over the public network from a second user 6B on a second device 8B. The second computer 10B has an API function 702B to process a given action key 50B. The other data that it can receive in message 754B include location data in the form of latitude, longitude, and a radius in a standard unit of measure, for example, meters. Second computer 20B queries database 500B using the action key 20B to retrieve the associated context record 210B. The database sends the query results to the second computer 20B in message 755B. The validation function 703B of the second computer 20B is called to validate an action key and its current context data, which includes the current time at the location specified by the location data, and the location data too. The current time is valid if it falls inside a time validity period in the context record 210B. The location data is valid if it falls within the area specified in the context record 210B. If the given action key is valid and its context requirements are met, then the second computer 20B generates an electronic trigger message 756B to the 3rd computer 30B. The trigger message 756B includes a reference to the stored procedure to be executed.

The 3rd computer 30B receives the electronic trigger message and executes the referenced stored procedure 410B.

After executing the stored procedure, the 3rd computer changes the status of the action key to indicate that the action key has been used. Alternatively, a counter indicating the number of times the action key has been used is incremented. Configuration data for the system can set a policy on the number of times an action key may be used. The count of the uses of action key 50B can then result in the status of the action key being set to indicate that the action key is no longer valid.

The context record 210B holds the status of the action key 50B as well as the action key 50B itself. The status of the action key starts as created 601B. The status is set to activated 602B when the stored procedure 410B is ready. The status is set to used 603B when the action 410B associated with the key 50B has been used. If the action key 50B is not used in the time period of validity set in the context record 210B, then the status of the action key 50B is set to expired 609B. An action key 50B status can be set to voided 610B to invalidate the key. In this case, the action record 401B and action 410B are deleted from the datastore 500B.

Figure 15:
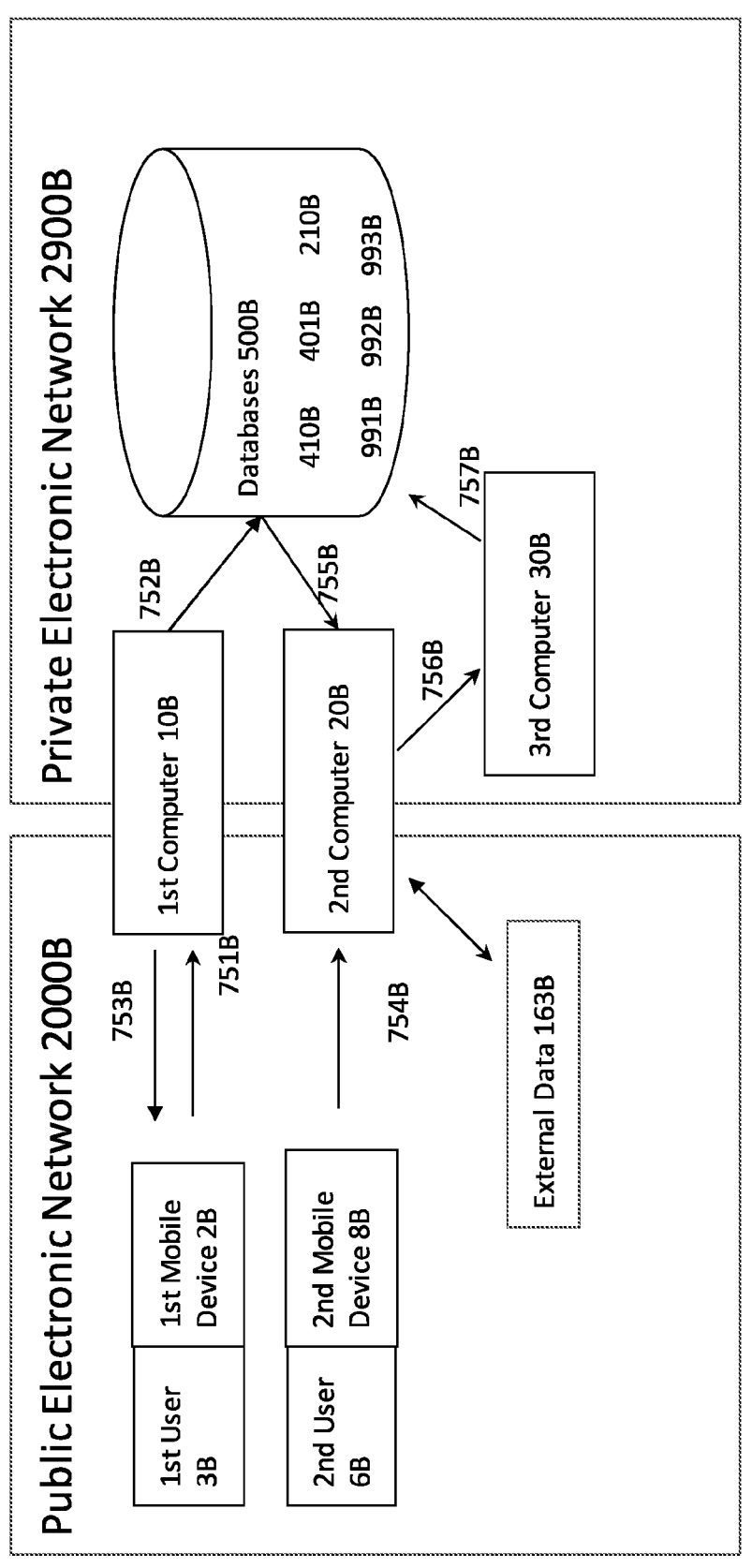
FIG. 15 depicts a more detailed schematic of the system showing user accounts.

FIG. 15 depicts a schematic of the system of the present invention further with persistent user accounts associated with each user of the system. The user accounts 991B 992B and 993B are for the first user, second user, and the system itself respectively. The description of FIG. 15 is the same as FIG. 14 with the addition of the following description. The action key returned by first computer 10B is also stored in the first account 991B representing the profile for the first user 3B. Each user is associated with an user profile 99B data structure shown in FIG. 23. When a system API is used for programmatic access to the system of the present invention, an API key and authentication procedures associate the API usage with a registered API user. Programmatic access via the API and manual access by a user are considered the same for the purposes of this description since a user accessing the first computer does so from a device running an application which uses the API of the first computer. When a user interacts with the system, the actions taken by the system on behalf of the user are associated with that registered user. The first computer 10B modifies the account 991B of the first user 3B. The second computer 20B modifies the account 992B of the second user 6B. The third computer 30B may modify either account 991B or 992B.

There are many use-cases for the present embodiments. One use-case is for financial transactions. Another use-case is in home automation. Another use-case is referral rewards. Another use-case is logging into a service. Another application is doing a data transfer between unknown parties. Of the many possible use-cases, the remainder of the present application will focus on the financial use-case, wherein a stored procedure created by a first user credits the bank account of a second user. In the remainder of the present application, a stored procedure 410B is called an authorized action 410B, an action key 50B is called an authorization code 50B, and a context record 210B is called an authorization code record 210B.

Figure 16:
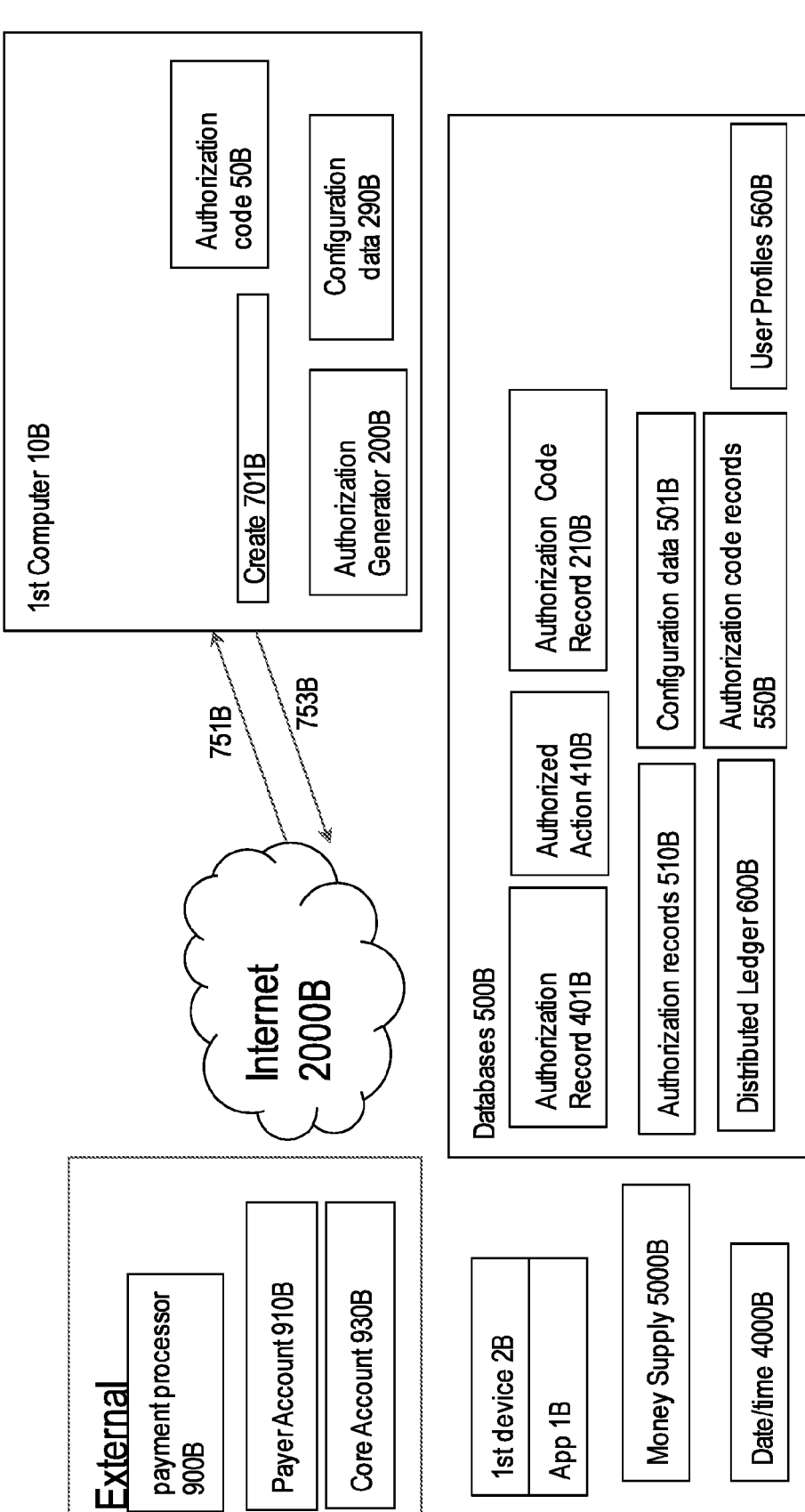
FIG. 16 depicts a schematic of a system for creating a future deposit.

FIG. 16 depicts a schematic of the system of FIG. 15 focused on the interactions of the 1st computer 10B. FIG. 16 shows the system configured for processing a request by a user to obtain money from a financial account 990B. The first computer 10B is shown with an authorization generator 200B, configuration data 290B, authorization code 50B, databases 500B, connected to Internet 2000B and receiving message 751B.

A set of computing resources, running, for example, on a cloud platform such as Amazon's AWS service, are on a public electronic network 2000B and process instructions implementing a set of APIs which are invoked by an application 1B running on a device 2B. Device 2B is a mobile networked computing device like a smartphone. The cloud platform provides computing resources, network routing, Internet connectivity between the cloud platform resources and a user device 2B and between the cloud platform and an external third party payment processor 900B. The external third party payment processor is used for transactions involving accounts that are external to the system. This schematic description will focus on the transaction from one internal account 990B associated with the account 990B of the first user 3B.

Create function 701B is a cloud function that writes an authorization record 401B to datastore 510B, generates an authorization code 50B, stores it in an authorization code record 210B and stores the record 210B in datastore 550B, and returns the authorization code 50B to the caller of function 701B with message 753B. It requires a function argument specifying the amount to be withdrawn from the first user's account 991B. It sets the status field in the authorization record 210B associated with the authorized code 55B to created 601B. Function 701B withdraws that amount from the first user's internal account 990B. Upon successful deduction of the amount 125B from the internal account 990B, this function sets the authorization record status to funded 602B. This function creates the authorization action 410B to deposit amount 125B and stores the associates the authorized action 410B with an authorization record 401B. The authorization record 401B is stored in the authorization records database 510B. The mapping of the code 50B to the authorization record 401B is stored in a database 550B in a way that the authorization code can be used to fetch the associated authorization record 401B.

First computer 10B debits the user's account 991B. User's account 991B is a profile data structure 99B. The actual field that is transformed is the internal account 990B in the user's account 991B. The money debited from account 991B is represented to the user 3B as an authorization code 50B which is delivered to application 1B in message 753B.

In an alternate embodiment, a distributed ledger of a blockchain system or other decentralized trusted query processor 600B is used instead of databases 500B. The decentralized query processor can be implemented using blockchain technology currently in use for decentralized financial transactions.

To fund a code that was created offline by a user, function 701B of the first computer 10B is invoked with all the information of the message 751B and an additional piece of information, the authorization code 50B to be funded. In this case the authorization generator 300B uses the given authorization code 50B instead of generating a random code.

The authorization code 50B can refer to money in any single or mixed set of currencies. The account 991B may represent money in any currency, including a cryptocurrency, such as Bitcoin. The ownership of an authorization code 50B can be registered in a blockchain separate from the Bitcoin blockchain. The associated Bitcoin private key can be stored in the blockchain and recovered in the future. The use of an authorization code 50B can simplify the trading of Bitcoin since the authorization code 50B is a shorter code and easier to communicate. A sample Bitcoin private key 9999 is shown in FIG. 22.

The authorization generator 200B will only generate an authorization record 401B and an authorization code 50B for a user 3B when the user 3B has successfully authenticated and logged into the application 1B. An authorization code that is intended to represent money is funded by the user from a trusted bank account 920B. The funds are transferred to a central account 930B owned by the operator of the digital money system using existing digital banking means. Information about a payer bank account 920B is stored in the user profile 99B associated with a user 3B or is requested from user 3B by application 1B and verified using a payment processor 900B before an authorization code 50B is associated with monetary value. In an alternate embodiment, user 3B may fund an internal account 990B from payer account 920B and then fund authorization codes from the internal account 990B without the need for further contact with the payment processor 900B for the purpose of funding an authorization code 50B as long as the balance of the internal account 990B is sufficient. The internal account 990B is part of the user profile 99B associated with a user 3B.

For central bank purposes within a country or currency zone, a superuser 4B is allowed to create authorization codes 50B without funding them from a source bank account 920B. In this case, money is added to the overall money supply 5000B. The term central bank is used to mean the authorized issuer of currency in a jurisdiction, for example, the European Central Bank. For its members, a company or any organization, a superuser 4B can similarly generate an authorization code for money without a source of funds from a bank account 920B increase the amount of available money in the money supply 5000B.

Figure 17:
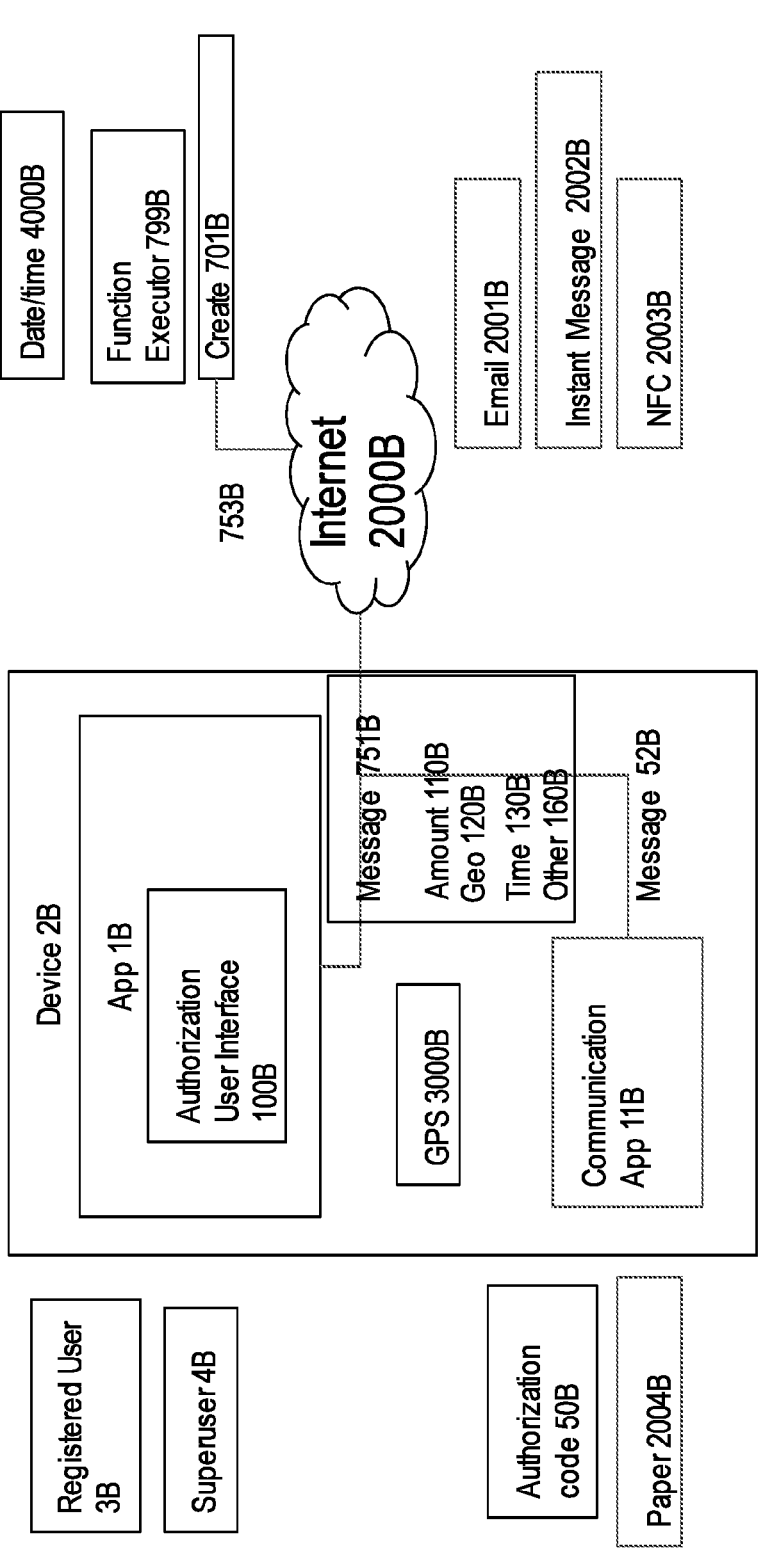
FIG. 17 depicts a schematic of a user interface for withdrawal of money from a bank account using a mobile device connected to the internet.

FIG. 17 depicts a schematic of a user experience for withdrawal of money from a bank account using a mobile device connected to the internet and running an application 1B offering a user interface 100B according to an example embodiment. This novel user interface improves the state of the art of ATM technology. The device 2B is coupled to the system as described above and configured for withdrawing money from an account. The components of this figure will be described followed by the interactions of the components.

App 1B is a client-side application running on a device 2B. The App 1B may be implemented as a native application or as HTML and Javascript and CSS in a browser.

Device 2B is a smartphone or other computing device with the ability to run a web browser or to run a client-side application 1B. For example, this could be a laptop, a smartphone running an operating system and a native application such as an "Android App" or an "iOS App". User 3B is a user of the system, registered with the system. Superuser 4B is a special user in the system with the ability to generate authorization codes for money in the absence of a funding account. The result is that this special user is able to create new money. This new money adds to the money supply 5000B. Normally, a financial transaction moves money from one account to another. In this case, money is added to a financial account but not deducted from another similar financial account. With this permission, a central bank is enabled to control the amount of money available to a community.

Each user has an associated profile 99B with information about the user. A user has credentials for logging into the system and will have a history of the user's transactions and actions stored in the profile. For a financial transaction system or any system controlling security-sensitive outcomes, in the preferred embodiment, the profile is populated with the first and last name of the user, an email address belonging the user and verified to be so, a mobile telephone number belonging to the user and verified to be so. The profile is populated with information about a financial account belonging to the user and verified to be so.

The Internet 2000B is the Internet as known at the time of the present application.

Application User Interface 100B is a set of user interface elements for logging into the system, specification of an authorization of a future action, for viewing information, for viewing a history of prior transactions, for viewing pending authorization codes, and generally interacting with and controlling the system. A specific authorization that is used as the example embodiment in this application is that of giving money. In this case, the user interface provides data entry graphical user interface elements for entry of information needed to complete a future transaction. The future transaction will allow the system to credit the account 992B of a second user 6B or to allow the system to credit the account 991B of the first user 1B; to give or request money, that is.

The application 1B implements an authorization user interface 100B that allows a first user 3B to retrieve an authorization code 50B from the system of the current invention. In general, the first user 3B will give the authorization code 50B to a second user 6B. The second user 6B may be the same human as the first user 3B, but the two users are distinguished in this application for illustrative purposes to show how money can be given from one person to another.

The first user 3B is provided a graphical interface to enter an amount of money 125B, a time period 130B for the validity period of the authorization, a geographic area specification 130B for the validity of the authorization and other data 12B to constrain the future validation of the authorization code 50B. For example, there might be an entry field for specification of the temperature in Los Angeles at the time of the claim.

Any user interaction elements known to those skilled in the art of programming with Javascript and HTML may be used. An input field accepting a numeric value and validating that numeric value combines with a set of buttons to change default time and location constraints to be associated with the authorization code record 210B. Additional constraints may be associated with the authorization code record 210B as described. The Application user interface 100B allows the user to see a visual representation of the authorization code when the authorization code is returned from Message 751B is an electronic message between the App 1B and the Create Function 701B. Application 1B creates message 751B packaging the information provided by the first user 3B. Application 1B then invokes function 701B on the first computer 10B by sending message 751B to it. Message 751B is communicated over a public electronic network 2000B, possibly including the cellular and mobile telephone networks or WiFi networks and eventually reaching the Create Function 701B of the system.

Application 1B receives an authorization code 50B in message 753B. Authorization code 50B is the visually represented in the user interface 100B. This authorization code 50B represents digital money. The system of the present invention processes authorization codes. The system of the present invention processes digital money 50B. In this use-case, first computer 10B is invoked with message 751B. Computer 10B generates an authorization record 401B and an authorization code 50B. The user interface 100B allows user 3B to select a currency or to accept a default currency as set in preferences 9911B and to enter a number representing an amount of money in that currency, for example $5.00 to represent five US Dollars. The user interface has a confirmation button to confirm the pick-up authorization amount. The user interface has a date time selector to simplify the optional specification of a validity start date and time and end date and time, or alternatively, a duration of validity can be specified, for example, two hours. The current date and time 4000B are used in this process. Once the confirmation button is pressed, a message 751B sent over a public electronic network 2000B causes the create function 701B to be invoked.

The user interface allows the first user 3B to generate a funded code which can be given to another user 6B. In this case, the second user 6B presenting the authorization code 50B to the second computer system 20B will result in a deposit into the account 992B of the second user 6B.

The user interface allows the first user 3B to generate an unfunded authorization code. When a second user 6B presents an authorization code 50B in the created state 601B to the 2nd computer 20B, the result will be a deposit into the account 991B of the first user 3B. In this way, authorization codes can be created to give or to request money. Message 52B carries the authorization code as communicated by communication app 11B to a second user 6B.

Communication App 11B is a service that communicates information between and among users of its channel of communication. Examples include instant messaging applications, email applications, photo sharing applications, applications that use the NFC or near-field-communication channel. Channels include: instant messaging 2001B, such as Twitter and Instagram, and email 2002B, and wireless channels like Bluetooth or NFC 2003B, and even pen-on-paper 2004B, which is an old and familiar channel of communication that does not require electricity nor devices beyond a writing instrument and paper 2004B or medium on which to write.

GPS 3000B calculates the geographic location of the device and delivers that information to an application. In this case, GPS 3000B is available on device 2B and is used by application 1B to provide a trusted geographic location to the application.

Function executor 799B is the hosting infrastructure for the computing resources that execute a cloud function or a ReST API server call in a more traditional client-server web application.

Figure 18:
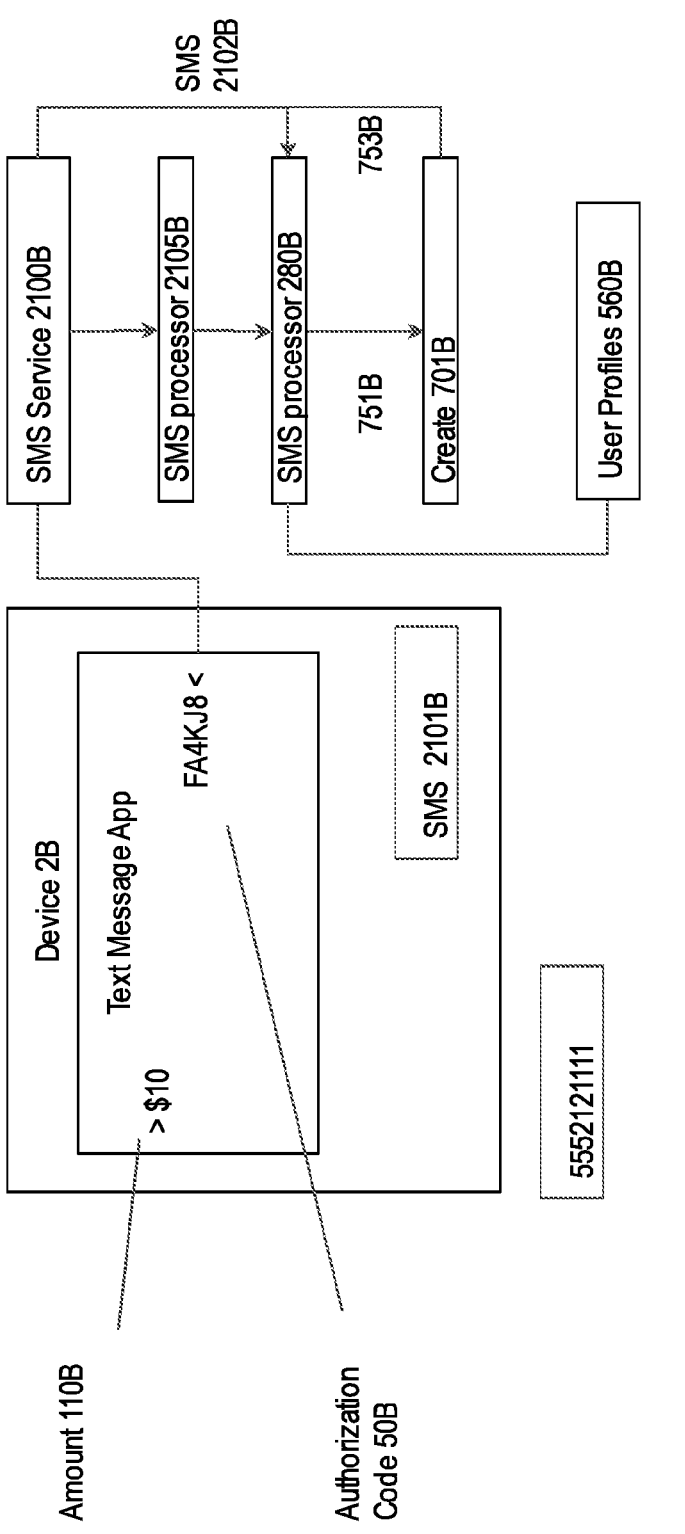
FIG. 18 depicts a schematic of a user interface for withdrawal of money from a bank account using SMS telephony services.

FIG. 18 depicts a schematic of a user interface for withdrawal of money from a bank account using SMS telephony services coupled to the system according to an example embodiment. In this embodiment, an SMS processor 2105B is configured to receive SMS messages and parse them. A first user 3B on device 2B sends a text message 2101B of the form "$_", for example "$10", to an SMS processing telephone number 5552121111 associated with the system of the present invention. When SMS 2101B is received of the form "$_", for example "$10", the processor 2105B receives the SMS 2101B from the telephone network and sends a message over the Internet 2100B to SMS processor 280B which then looks up the mobile number associated with the SMS 2101B and finds the user profile in database of user profiles 560B.

If a user profile is found with a verified mobile number matching the incoming number, then that user is considered first user 2B. The processor 280B then creates a message 751B with the parsed amount 125B and invokes the create function 701B. When the reply message 753B is received at the processor 280B, a request is sent to SMS processor 2105B to generate an SMS 2102B with the authorization code 50B in the text body of the message. The SMS processor 2105B then sends SMS 2102B over the telephone network as a reply to the mobile number. The existing SMS messages interface on the smartphone device 2B acts as the built-in user interface. First user 3B may optionally include location information in the form of latitude, longitude, radius producing an SMS in the form of "$_ lat,long,radius" where an amount and area information are in the body of SMS 2101B. The time period can be added to the body of SMS 2101B in the form "_ days" to specify a number of days of validity from now. The time period defaults to preferences 9911B set in the user profile 99B associated with first user 3B. The geo-fence area defaults to preferences 9911B set in the user profile 99B.

Figure 19:
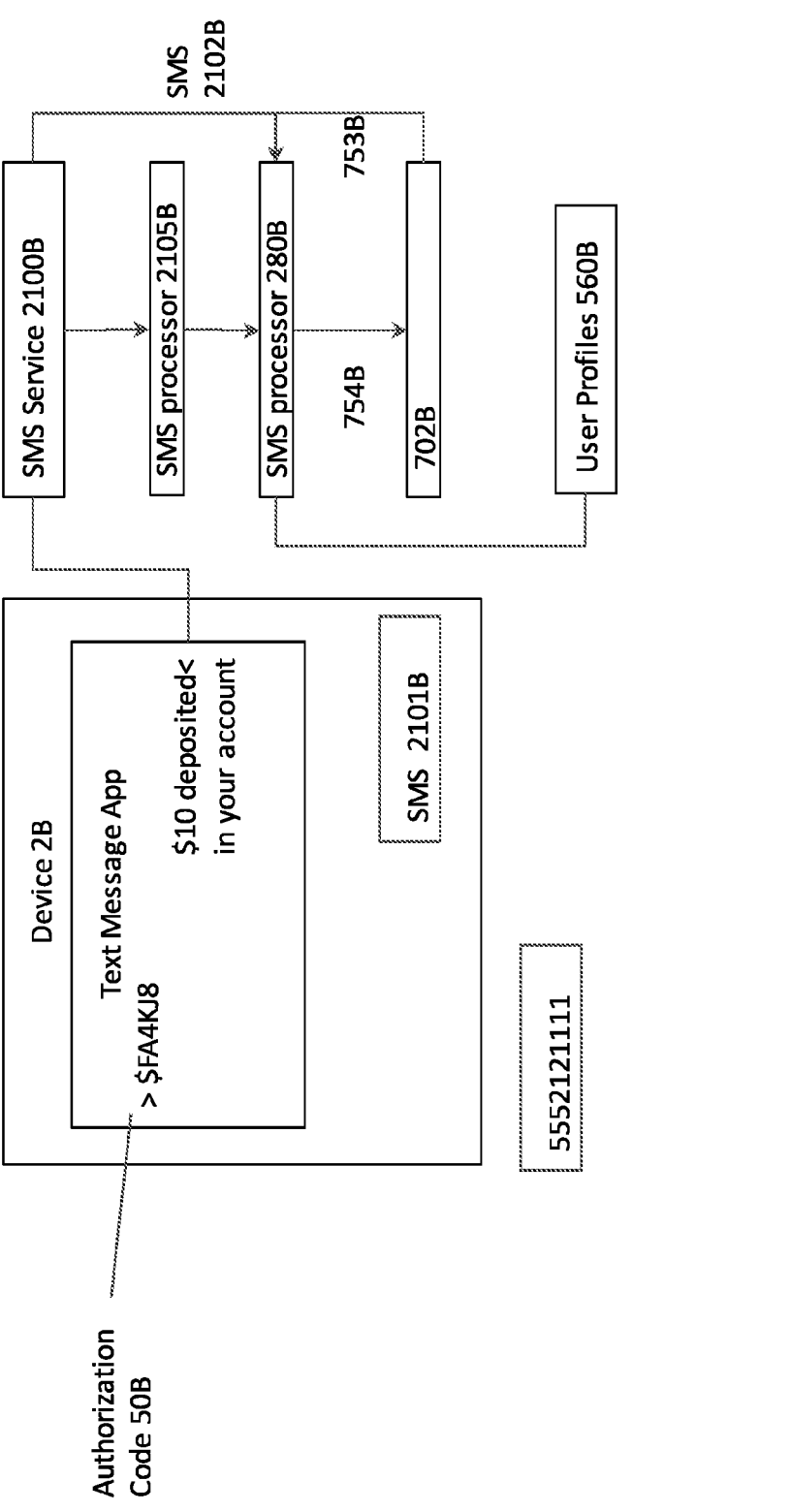
FIG. 19 depicts a schematic of a user interface to deposit money into a bank account using SMS telephony services.

FIG. 19 depicts a schematic of a user interface to deposit money into a bank account using SMS telephony services may be provided. In this embodiment, an SMS processor 2105B is configured to receive SMS messages and parse them. A second user 6B on device 8 sends a text message 2101B of the form "_ _ _ _ _ _", for example "FA4KJ8", to a main SMS processing telephone number 5552121111 associated with the system of the present invention 5552121111. When SMS 2101B is received of the form "_ _ _ _ _ _", for example "FA4KJ8", the processor 2105B receives the SMS 2101B from the telephone network and sends a message over the Internet 2100B to SMS processor 280B which then looks up the mobile number associated with the SMS 2101B and finds the user profile in database of user profiles 560B.

If a user profile is found with a verified mobile number matching the incoming number, then that user is considered first user 2B. The processor 280B then creates a message 751B with the parsed amount 125B and invokes the create function 701B. When the reply message 753B is received at the processor 280B, a request is sent to SMS processor 2105B to generate an SMS 2102B with the authorization code 50B in the text body of the message. The SMS processor 2105B then sends SMS 2102B over the telephone network as a reply to the mobile number. The existing SMS messages interface on the smartphone device 2B acts as the built-in user interface. Second user 6B may optionally include location information in the form of latitude, longitude producing an SMS in the form of "$_ lat,long" where an amount and location information are in the body of SMS 2101B.

FIG. 20 depicts a schematic of a data structure for an authorization code record and an example of an authorization code record. The authorization code record 210B is a data structure that is a JSON structure of variable length in the preferred embodiment. A sample authorization code record in JSON format is shown. The authorization code record 210B has a database lookup ID, an authorization code 50B, a time specification 132B of when the code is valid, a geographic specification 122B of where the code is valid, a maximum uses 142B number specifying the maximum number of times the authorization code can be redeemed, and a status array 152B of length matching the maximum uses number storing a state for each use of the authorization code. The authorization code record may have other fields specifying other criteria for validity of an authorization code when redeemed.

The authorization code 50B is a randomly select set of characters from a character set. The basic composition is 6B alphanumeric characters including punctuation marks available on a keyboard. The code itself need not divulge the payer or recipient or the amount of money being authorized. However, the code may be extended to include the currency and amount of the money it represents. This extension further minimizes the probability of a lucky guess by a would-be code guesser. An example extended code looks like this: K8J3ZQ$3.00 or USD3.00K8J3ZQ in an alternate form. Such a code requires a recipient to enter the correct code, currency symbol, and amount. A code can be extended by specifying an identity, either as a true identity to be verified before release of funds, or as further means for reduction of fraud and therefore simply a shared secret.

An example of an extended code in this case is: K8J3ZQ$3.00@john_doe@gmail.com. The general composition is 6 alphanumeric characters including punctuation marks available on a keyboard and a currency symbol or a currency code, for example, USD, to represent the US Dollar, and a decimal amount with an optional decimal point and optionally including an entity identifier. The entity identifier can be the person generating the code or the person meant to be receiving the code. The additional identifiers can be in fact used by the authorization processor 400B or act as additional code characters which are provided by the user 3B and not generated by the authorization generator 200B. The authorization code 50B itself may be input by the user 3B in order to make it possible for a person to generate digital money by simply thinking of and writing down an authorization code 50B along with an amount, for example, K8J3ZQ$3.00 or simply K8J3ZQ without the amount indicator, then giving that information to someone or writing it down on a piece of paper and leaving it for someone, and later, funding the authorization code 50B by generating an authorization record 401B using an authorization generator 200B by way of a device 2B and an app 1B and a user interface 100B.

The number of recipients who may redeem an authorization code is specified in the authorization code record as the maximum uses 142B number. The maximum uses 142B can be one or more. Therefore, one code can be used, by the same or different recipients, one or more times, as determined by the authorizer or set of authorizers who happen to have created the same non-unique authorization code. Therefore, also, multiple codes can be generated for the same authorization to be picked up by one or more recipients. The authorization code record specifies data in addition to the authorization code to validate and authenticate and process each presented authorization code. Validation includes location geographic data 122B from a global position tracking system or entered by the user, a date and time 132B, or other data 12B from the Internet associated with a location and date and time, for example, the weather or temperature or type of venue, for example a stadium, a school, or a playground, or a train or ship.

Figure 21:
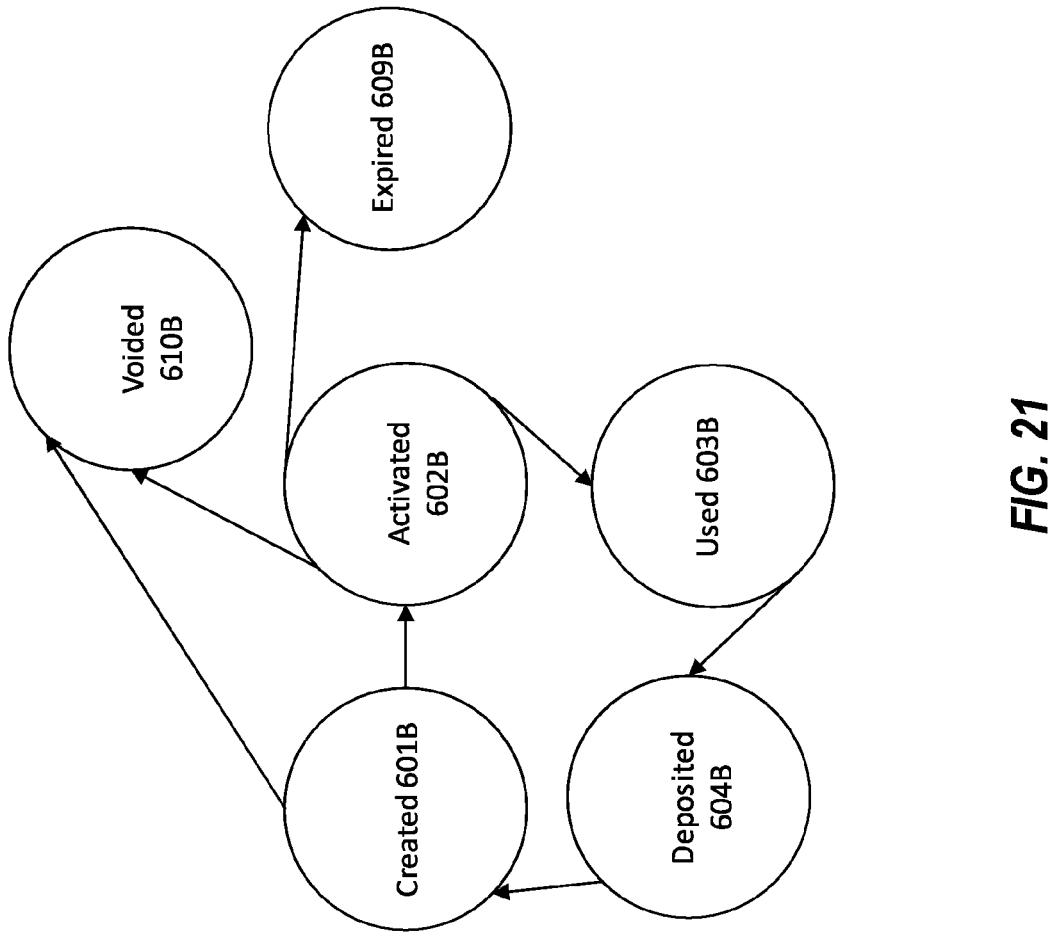
FIG. 21 depicts a schematic of the states of an authorization code.

FIG. 21 depicts a schematic of the states of an authorization code. An authorization code is in one of several states of: created 601B, funded 602B, redeemed 603B, deposited 604B, voided 610B, or expired 609B. When an authorization code record is first created by the authorization generator 200B, the status of the authorization code is initially created 601B. An unfunded authorization code can be generated and visually shown to a user or printed for a user. The status of the authorization code is set to funded 602B when a value is associated with an authorization code, and there is sufficient balance in the internal balance 990B to cover the amount 112B authorized by the authorization code, or there is an external account 920B associated with the authorization code. The status of the authorization code is set to redeemed 603B by the authorization code processor 300B. When an authorization code is set to the redeemed 603B status, its maxUses property 142B is decremented. An authorization code has an array of status values. The array length is set to the size of maxUses 142B when the authorization code record is created. For example, if the authorization is for $10 to be picked up 3 times, for a total of $30, then the status array is made to be of length 3. There will be 3 status fields, each being set to created 601B at the outset if not funded yet or to funded 602B if funded. To be funded, the internal account 990B must have at least $30, in this example.

FIG. 22 depicts a schematic of a data structure for an authorization record and an example of an authorization record. An authorization record is created in response to a request for withdrawal of money by a user in order to authorize a future deposit transaction with that money. An authorization record comprises an authorized action and parameters for that action. The authorized action is javascript code to be executed, a command understood by the system, or an arbitrary cloud function URL. In one embodiment of the present invention, the authorization action is defaulted to a function that deposits money of the given amount into the internal account 990B of the user successfully redeeming the authorization code 50B associated with the authorization record. The preferred embodiment creates a cloud function, an example of which is shown in FIG. 17. The cloud function acts as the authorized action and executes the authorized action and also holds the needed data for the authorized action. The data needed for the withdrawal of money is the amount 112B that will be deposited in the future. The amount comprises a currency, for example "USD", and an amount, for example, 5.25.

Figure 23:
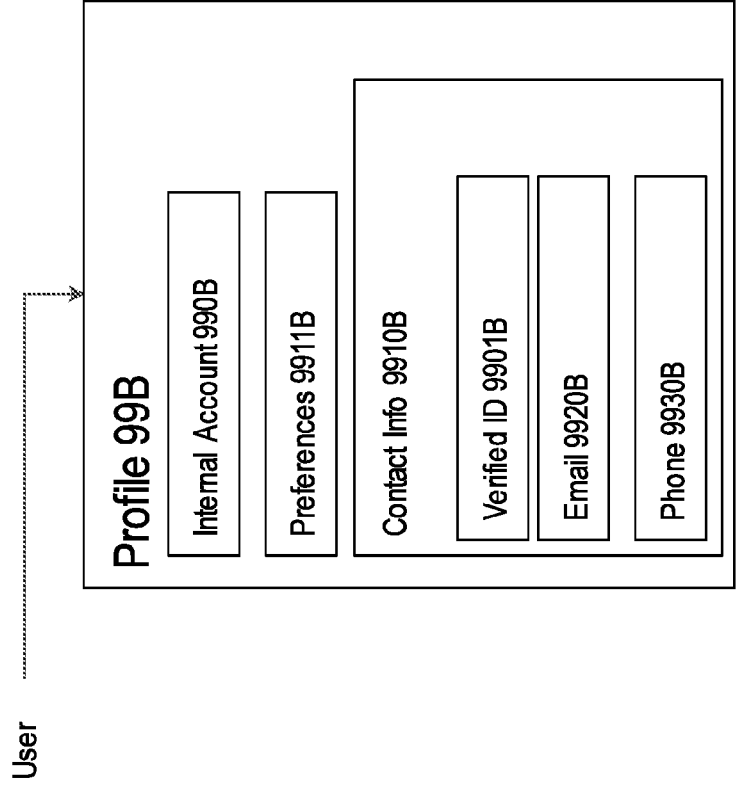
FIG. 23 depicts a schematic of a data structure for a user profile.

FIG. 23 depicts a schematic of a data structure for a user profile may have a data structure. The user profile data structure 99B holds information about the user and the user's financial accounts and preferences. The data in this structure guides the user interface and user experience of the user when interfacing with the system of the present invention. The structure holds an internal account 990B, a verified ID 9901B, contact information 9910B, preferences 9911B, email address 9920B, phone number 9930B.

FIG. 24 is an example of a cloud function. A cloud function is marketed under the name Lambda Function by Amazon's Web Services, AWS, and as Cloud Functions, by Google Cloud Platform, and by other names. A cloud function has a URL and can be triggered also by a specific named event in the respective platform hosting the cloud function. An example of a cloud function is shown. In some embodiments, the cloud function holds the amount of the deposit to be made in the future. This amount is equivalent to the amount being withdrawn by the user making the withdrawal request resulting in the creation of the authorization record and a cloud function such as this one. The cloud function is generated dynamically in response to a user request to withdraw money. The cloud function is defined to be one that deposits money to the account of the user that invokes it.

FIG. 25 depicts a schematic of datastores used in the system. Datastore 510B stores all the authorization records that are awaiting triggering. Authorization records that have been exhausted or voided are moved to an archive datastore. Datastore 550B stores all the authorization code records that are awaiting redemption. These are all in the created state 601B or the funded state 602B. The authorization code records for authorization codes that are in the expired or voided or redeemed or deposited states are moved to an archive datastore. Datastore 530B maps an authorization code record to the user who created it. Datastore 520B maps an authorization record 401B to the user who triggered it. The associations and mapping implementation depends on the datastore used. In the preferred embodiment, the datastore uses a foreign key to reference data in another table.

Figure 26:
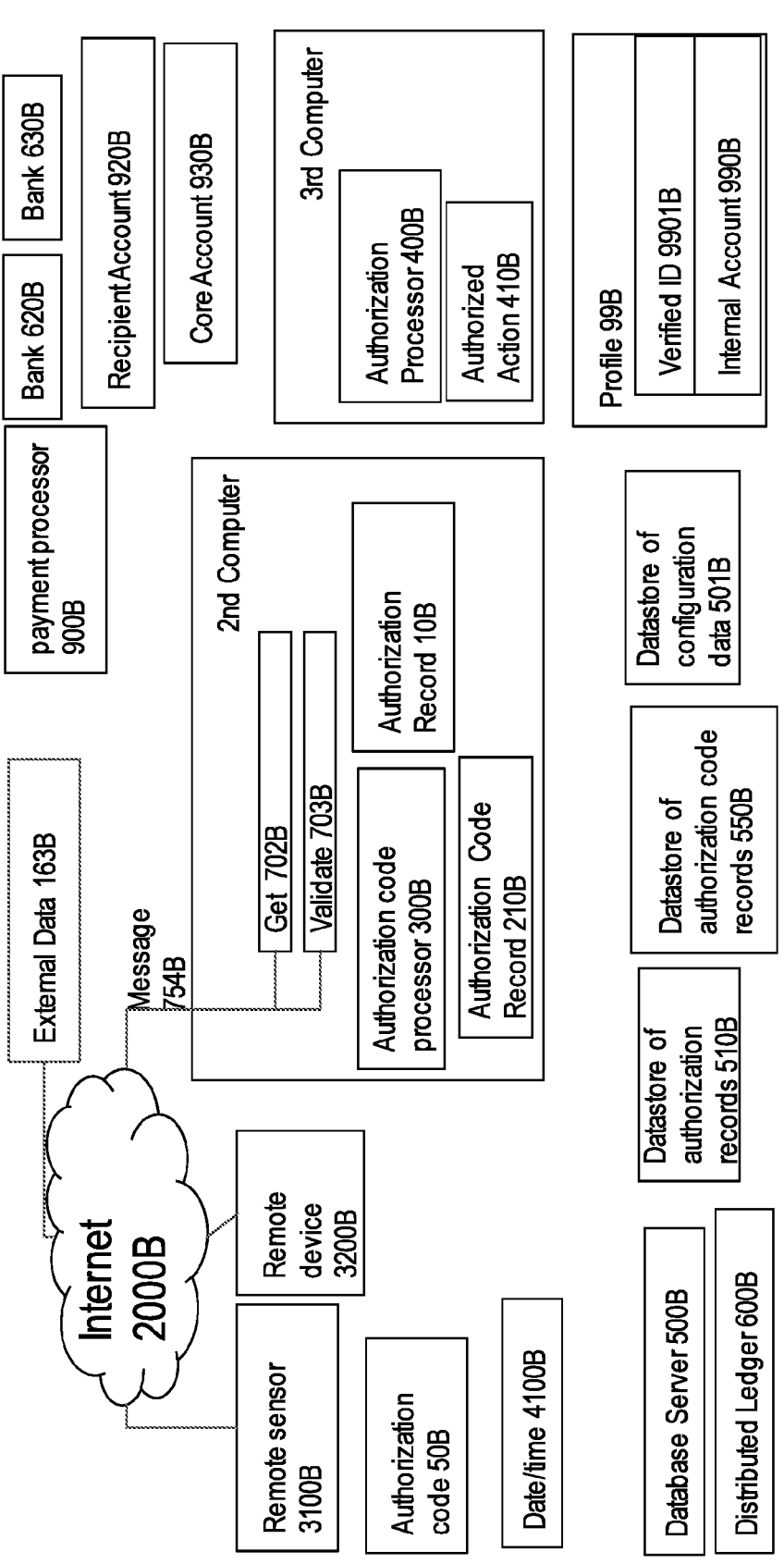
FIG. 26 depicts a schematic of a system of the present invention configured for depositing money.

FIG. 26 shows the system may be further configured to deposit money into the account of the second user 6B. The system operates as described with FIG. 14. Further detail is provided here as to the functions of the second computer 20B and the third computer 30B. The second computer 20B has an authorization code processor 300B. A cloud function 702B in response to receiving a message 754B will invoke the authorization code processor 300B giving to it the data received in message 754B comprising an authorization code 50B and location data 120B. The processor 300B queries the database 500B for the existence of the authorization code 50B by using a series of messages and functions. Each such interaction and sequence of functions and messages are associated with a user 3B and not otherwise accessible or operable. If the authorization code 50B that is presented to the authorization receiver 300B is found and validated against context constraints specified in the authorization code record 210B, then the authorization record 401B mapped to the authorization code 50B is retrieved from the database 500B or the decentralized ledger 600B, then a message 756B is delivered to the third computer 30B and authorization record 401B is processed by the authorization processor 400B.

The authorization code record 210B may indicate geographic boundaries within or outside of which the user 3B must be at the time of the requested redemption of the authorization code 50B. At the time of redemption, the current date and time 4100B are checked against the time period validity parameters set at the time of creation of an authorization code 10B. The authorization code might have required that it be used within a certain time window or outside a certain time window.

The authorization code processor 300B provides information specifying the recipient account to the authorization processor 400B. The authorization code processor 300B uses information from the user profile 99B associated with a user 3B. When an authorization code 50B is received by the authorization code processor 300B and the configuration data 290B specifies that the system of the present invention is configured for financial transactions, information from the authorization record 401B is used to determine the amount of the transaction, the currency, and validity of the presented authorization record. The set of financial accounts to be credited are retrieved from the user profile 99B associated with user 3B. The current date and time 4100B at the time of redemption of the authorization code 50B is used to determine the time period validity.

Similar to the check of the date time at the time of redemption, the user 3B may be required to provide a geographic location by means of enabling a GPS sensor 3000B on device 2B or by way of positioning a graphical location marker on a map presented to the user 3B on the user interface 100B. The provided geographic location information can be checked against constraints specified in authorization code record 210B in order to allow or deny the processing of an authorization action 410B. Transfer of money into the account of the second user 6B is a possible authorization action 410B. Transfer of money from the account of the second user 6B is a possible authorization action 410B.

If other external context constraints were specified by first user 3B, then data from remote sensor 3100B and remote device 3200B may be probed or retrieved and used in validation of the authorization code 50B.

The redemption of an authorization code 50B can be restricted to registered users. When an authorization code is redeemed, information from the user profile 99B associated with user 3B is combined with information provided by the payer by way of the authorization record 10B. The authorization processor 400B can provide these two sets of information to the payment processor 900B in order to allow the payment processor 900B to complete a financial transaction using prior art means of effecting a financial transaction between two financial accounts.

The third computer 30B uses the information in that pick-up authorization record 401B in an invocation of the authorization processor 400B to execute the authorized action 410B. The authorization processor 400B executes the authorized action 410B. Authorized action 410B is a stored procedure that credits the account 992B of the 2nd user 6B. The internal account 990B of the profile 99B data structure of the user is credited.

The authorized action 410B has a prescribed set of instructions that are executed by the authorization processor 400B. There may be a proprietary vocabulary of instructions used between the authorized action 410B and the authorization processor 400B. These instructions could be unrelated to a financial transaction. They could be instructions to open a door in a house or unlock a door or, in a virtual sense, could unlock a future step required by a set of instructions in another authorization record.

Figure 27:
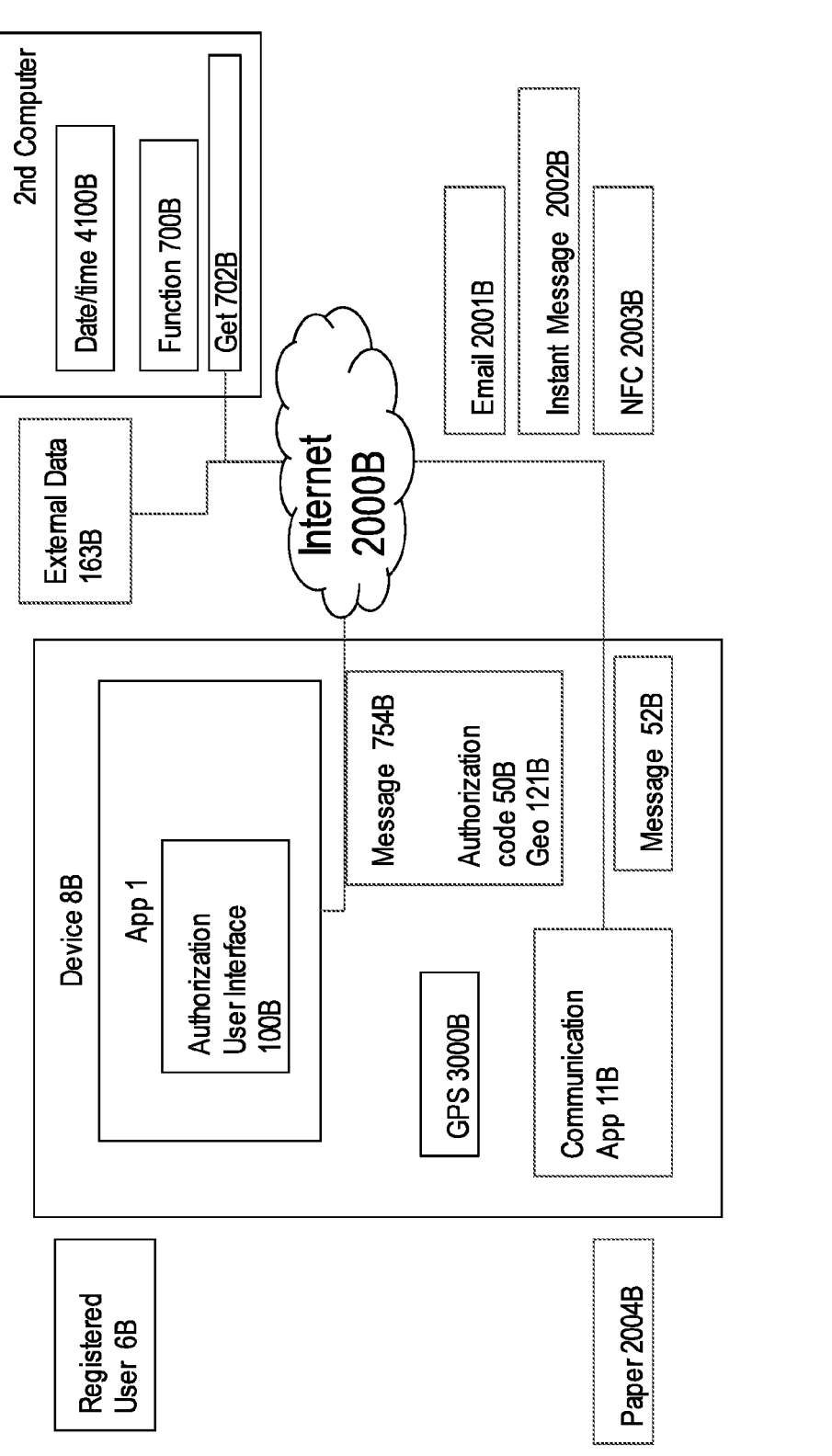
FIG. 27 depicts a schematic for triggering a deposit of a user interface provided by an application on a device coupled to the system.

FIG. 27 depicts a novel user interface that simplifies the task of depositing money associated with an authorization code 50B. The user interface 100B is provided by application 1B on device 8B and focuses on the interactions of the second computer 20B and the second user 6B from second device 8B.

The disclosed embodiments enable a person to generate a short code representing money, sending that short code to someone by any means convenient, and that receiver of the code to be able to verify the authenticity and value of the token in terms of money, and to be able to end up with that amount of money, possibly an equivalent amount in a second currency, in his or her financial account. The communication of the authorization code 50B from one person to another or from one device to another is external to and independent of the system of this invention. In order to redeem an authorization code, a person enters authorization code 50B into app 1B and the app 1B generates a message 751B that travels over the Internet 2000B to an authorization code receiver. The authorization code 50B can be entered by typing the authorization code, scanning a QR code representing that authorization code, or speaking the authorization code into a microphone that delivers the audio signal or the recognized authorization code 50B from the speech signal to the authorization receiver.

The authorization processor 400B accesses information identifying the financial account of the recipient 910B. This information is in the a database record called the Entity Profile, 99B. The transaction processor 900B, therefore, receives two sets of information. One set of information is a subset of the authorization record 401B telling the transaction processor 900B information about the source of funds and the amount of money to transfer to the recipient. The second set of information is about the recipient's financial account and is a subset of the user profile, 99B. The two sets of information can be provided at the same time or different times. The two sets of information can be matched up using a common element, the authorization code. The two sets of information may be combined by the authorization code receiver, 300B, and provided to the transaction processor 900B. The information of the pick-up authorization record 401B can be delivered to the transaction processor by one entity and the recipient data from the recipient's user profile, 99B, can be provided to the transaction processor by another entity. Alternatively, the transaction processor can use the authorization code 50B to fetch the recipient user profile, 99B. This is done by the app associating an authorization code with the recipient for the duration of the transaction. The app user enters the code, 50B, the code is associated with the recipient in the user profile, 99B, the code is sent to the code receiver, 300B, the code receiver, 300B, sends the code 50B to the transaction processor, 400B, along with the pick-up authorization record, 401B. Alternatively, the authorization processor, 400B, fetches the pick-up authorization record 401B from a database. The database where the authorization record is stored can be a single known database or one of many, the particular one used being selected based on the recipient, the payer, geographic location of the payer or the recipient, or another set of criteria.

Before successfully using the app 1B to get money from someone or to give money to someone, the user creates a user profile, 99B. The term user profile, 99B refers to either the user profile data for a payer or a recipient. This depends on the context. A payer generates a code. A recipient enters a code. A particular payment authorization, also called a pick-up authorization record 401B can be used one or more times. The payer specifies how many times a pick-up authorization code 50B can be used to give money to a recipient and whether each subsequent use of the code must be by a recipient who has not already picked up money or can be by the same recipient. In this description, the authorization of a payment of a specific amount of money is the authorized action. The invention is broader. The action authorized need not be limited to an action a financial transaction processor. The action can be anything. As such, what is described, is a system for generating an authorization code 50B by one party and an associated action, 410B, authorized by the first party to be completed upon presentation of said authorization code 50B by any second party. The transaction processor, 400B, may have information about the payer and the recipient in order to complete a transaction, however, the app 1B only needs to know about the user of the app by way of the user profile, 99B, for that user. The term user profile shall be defined to be the record of information which describes the user of the app and this term is distinct from the human we can refer to as the user of the app.

Figure 28:
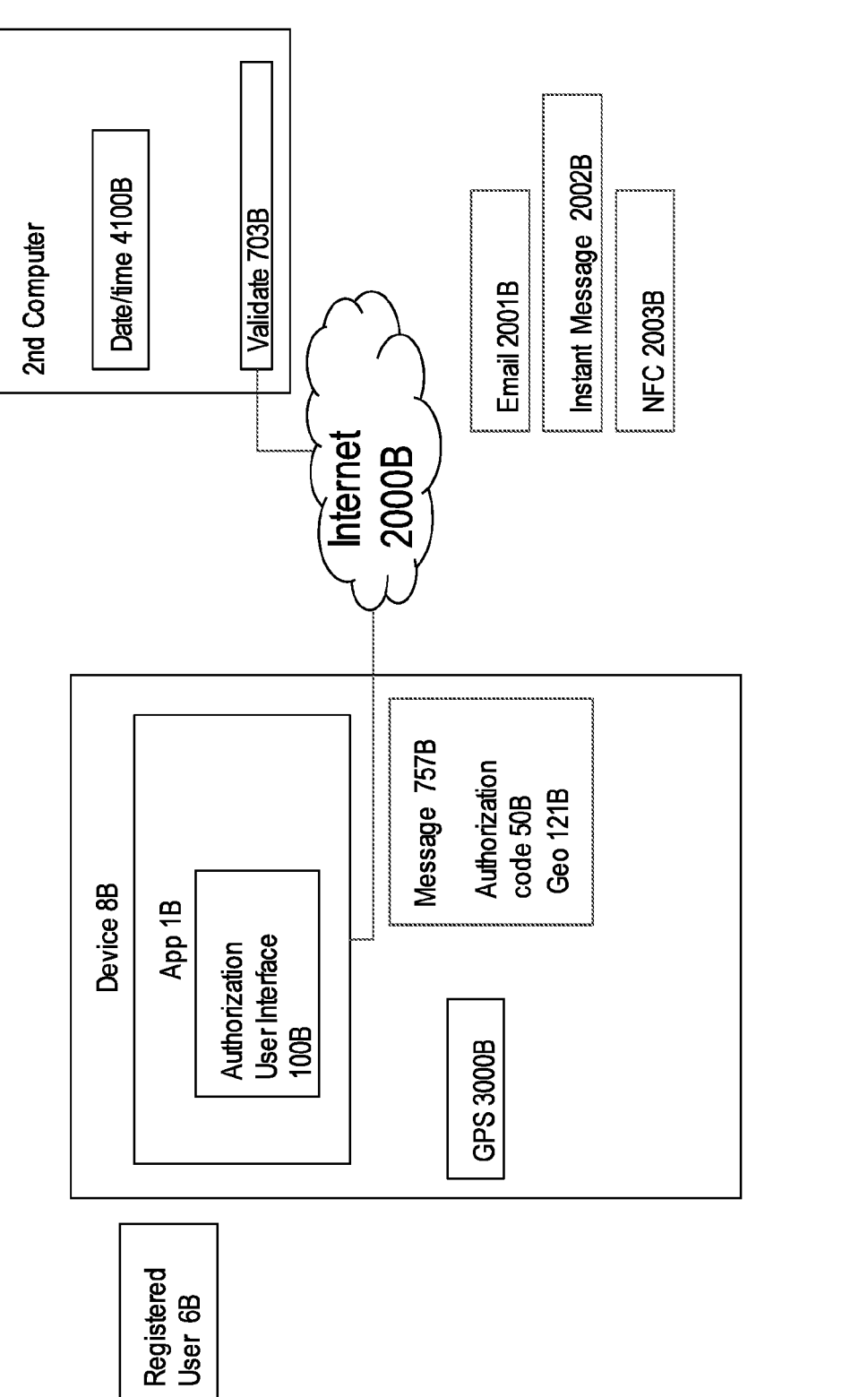
FIG. 28 depicts a schematic of a system for checking if money received from someone is valid.

FIG. 28 depicts a schematic of a system for checking if money received from someone is valid. The user interface and description is the same as for the process for depositing money. The only difference is that instead of requesting a deposit only a validation of an authorization code 50B is requested by a user. The application 1 creates a validation message 757B which is the same as the deposit message 754B and the message is delivered to the validation function 703B.

The disclosed embodiments also operate to ensure that the information (e.g., user profile, authorization code, etc.) are all securely managed and transmitted. In some instances, a user 3B uses app 1B on a device 2B and using the interface 100B presents an authorization code 50B to be verified and optionally processed. The authorization code processor 300B limits the number of authorization codes 50B that may be submitted for verification and processing by the authorization processor 400B. If not limited, all potential combinations could be presented to the system, quickly finding and potentially invoking all possible authorization records.

Some embodiments mitigate fraud with configurable features. One option is that the system treats the unintended recipient without prejudice and the result is not very different from leaving money on a table for a restaurant server only to have someone else pick up the cash. A second option is that the system checks for an additional piece of information, for example, a location associated with the authorization code. In this case, if the unintended recipient is in the same city as the intended recipient, then the unintended recipient got very lucky with a very rare correct guess of the six character code.

An additional safeguard in the system is that only a user can access the system for presenting an authorization code. An additional safeguard in the system is that only a small number of invalid authorization codes can be presented before the user is locked out of making more attempts. An additional safeguard in the system is that only registered users with a verified mobile phone number are permitted to present authorization codes. An additional safeguard is that each authorization code is valid for only a limited window of time, for example, a week. With these safeguards in place, a fraudster would need to register as a new user with a new valid phone number and go through the verification process for the phone number and attempt to guess at an authorization code. In a reference embodiment of the system a time window of 1 week is set and five incorrect authorization codes result in the user being blocked out for 24 hours. The result is that each user can attempt a very limited number of guesses when there are over 4 billion authorization code combinations possible. Furthermore, when each authorization code 50B is restricted to a circular area of a small radius, for example, a 10-mile radius, then the system is able to handle the transaction volume needed for the whole world.

Each registered users may have a verified ID 9901B in its user profile 99B. A user 3B is verified in a number of ways. One way is to send an SMS to the mobile number of the user. Each user provides a mobile phone number that is stored in the user's user profile 99B. An SMS is generated and sent to the mobile number with a short numeric code, for example, which must then be entered back into the user interface 100B of the app 1B. When successfully done, the mobile number is tagged as being verified and is linked to the user profile 99B of the user 3B and the user is considered to have a verified ID 9901B. Another way to verify the identity of a user 3B is by linking a verified bank account or other trusted account or identity to the user profile. These steps of ensuring a verified identity are by themselves not novel, but necessary steps. However, the use of a verified ID combines with other elements of the present invention for safeguarding confidence in the system and resulting in a system with utility.

The person presenting the authorization code may provide the needed identity for the recipient of the money associated with an authorization code. Previously, a financial transaction required a source of funds and a recipient of funds. While this is still the case, the disclosed embodiments decouple the need for knowing the source and the recipient. The authorization generator 200B needs the payer's account information 991B but not the recipient's account information 992B. In this way, the creator of the authorization code does not need to know the identity of the recipient. The recipient of the authorized action need not know information about the source party. Each party transacts against the central account 993B.

If an external financial account has to be used to fund a first user's internal account 990B, a payment processor 900B may be provided with the payer's account 910B based on information in the authorization record 401B which may contain the payer's account information or a link to the payer's user profile 99B wherein the payer's account information may be found. If an external financial account is to be funded from the second user's internal account 990B, a payment processor 900B may be provided with the recipient's account 920B based on information in the recipient's user profile 99B associated with the recipient. In the case of the first user, the external payment processor 900B is instructed to transfer from first user's external financial account 920B to the system's core account 930B in order to increment the first user's internal account 990B by the amount of the withdrawal before the internal account 990B of the first user is decremented by the amount of the withdrawal. In the preferred embodiment of the present invention, the recipient is paid from a core account 930B. In this way, the recipient has no connection to the payer except as discoverable by the examination of an authorization record 401B and records in the database 500B or decentralized ledger 600B associated with a given transaction. The authorized action 410B can be a blockchain operation to verify the ownership of the authorization code by the second user 6B.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for controlling creation of a subsequent transaction that can be carried out between a first user utilizing a first user device and a second user using a second user device and use of transaction keys to implement safeguards on the subsequent transaction between a first user utilizing a first user device and a second user using a second user device so as to control how and when a transaction will occur comprising:

initiating by the first user device through a public network a first creation process operating on a first computer system, which first computer system interfaces to a data store on a private network associated with a server computer system residing on the private network, wherein the first creation process defines the terms of the subsequent transaction as defined by the first user device for completion by the second user on the second user device independent of the first user device and the first computer system;

identifying by the first user device in a transaction key generation process operating on the first computer system an authorization code, which authorization code is uniquely associated with the first user device and which authorization code implements safeguards on access to the subsequent transaction by the second user using the second user device, the authorization code uniquely associated with both the first user device and the subsequent transaction between the first user device and the second user;

identifying by the first user device with the transaction key generation process on the first computer system a set of one or more parameters associated with the subsequent transaction, the authorization code and the set of one or more parameters required in order for the second user device to be authorized for participation of the second user device in the subsequent transaction for execution thereof, wherein the authorization code and the one or more parameters comprising the transaction key;

transmitting the identified authorization code and the set of one or more parameters from the first computer system to the data store associated with the server computer system on the private network for storage thereat in a stored authorization record in association with the subsequent transaction in addition to the defined terms for the subsequent transaction, which such step of storing defines the transaction as an authorized transaction at the server system and wherein the transaction operates on a third computer system that resides on the server system on the private network and is not accessible by the first computer system;

wherein:

the set of one or more parameters identified by the first creation process corresponds to inputs entered at the first user device by the first user, and the set of one or more parameters identified by the first user device with the transaction key generation process at least partially define the first user device defined requirements that must be satisfied by the second user device including attributes that are required to be input by the second user device in order to authorize participation by the second user device in an execution of the subsequent transaction on the third computer system, whereby participation by the second user device in execution of the subsequent transaction on the third computer system is facilitated with a second computer system that interfaces with the second user device through the public network and with both the data store and the third computer system on the server computer system, and which second computer system is independent of and isolated from the first computer system, wherein participation is dependent on both receipt by the second computer system of the authorization code and attributes from the second user device and satisfaction of the set of one or more parameters by the second user device;

sharing the authorization code with the second user device from the first user device outside of the transaction and independent of the first and second computer systems;

wherein the second user device in order to facilitate participation of the second user device in execution of the subsequent transaction by the second computer system on the third computer system is operable to generate and transfer to the second computer system as a transaction request the authorization code and attributes existing at the second user device corresponding to the set of one or more parameters;

upon receiving by the second computer system the transaction request from the second user device including the authorization code and the provided attributes associated with the second user device, triggering the second computer system to determine whether to authorize participation of the second user device in the execution of the subsequent transaction on the third computer system by comparing the transferred authorization code and the provided attributes from the second user device with the stored authorization code in the data store and the stored set of one or more parameters in the stored authorization record in the data store; and upon determining by the second computer system that the transferred authorization code and provided attributes from the second user device satisfy the stored set of one or more parameters and stored authorization code stored in the data store, generating an authorization for participation by the second user device in the execution of the subsequent transaction on the third computer system independent of the operation of the first computer system and isolated from the first user device, or, upon determining that the attributes of the second user device and transferred authorization code do not satisfy the set of one or more parameters stored in the data store, refraining from generating the authorization for participation by the second user device in execution of the subsequent transaction on the third computer system, wherein, upon generating an authorization for participation by the second user device in execution of the subsequent transaction on the third computer system, the second user device participates in execution of the subsequent transaction operating on the third computer system in accordance with the defined terms, the subsequent transaction controlled by the operation of the third computer system in accordance with the defined terms as stored in the authorization record by the first computer system.

2. The method of claim 1, wherein:

the transaction request is one of a plurality of transaction requests that are each received from a different user device, each operating in association with execution of the subsequent transaction with the first user device, such that each correspond to the subsequent transaction, the transaction request of the second user device is authorized by the server computer system, and a transaction request received from a third user device is not authorized by the server computer system.

3. The method of claim 1, wherein the set of one or more parameters includes one or more of the following: (1) an identification of one or more authorized geographic regions where the transaction request is required to originate from, (2) an identification of an authorized device or device type, or (3) an identification of an authorized user or user type.

4. The method of claim 1, wherein execution of the subsequent transaction includes providing goods or services to the second user device, and wherein the set of one or more parameters include an authorized quantity of the goods or services that are to be provided to the second user device.

5. The method of claim 1, wherein the authorization code is one of a plurality of authorization codes that are associated with the subsequent transaction and that are controlled by the server computer system, and wherein the plurality of authorization codes are all included in the stored authorization record.

6. The method of claim 1, wherein the set of one or more parameters includes an expiration for the authorization code from the time of creation of the authorization code such that, when the expiration occurs, the authorization code becomes invalid.

7. The method of claim 1, wherein the set of one or more parameters defines whether the authorization code is valid for a single invocation of the authorization code or is valid for multiple invocations of the authorization code.

8. The method of claim 1, wherein the subsequent transaction includes at least one of: permitting entry through a physical barrier, or permitting receipt of data extracted from a user's account.

US 12,591,883 B2

35

9. The method of claim 1, wherein the set of one or more parameters is modifiable even after the authorization record is generated and stored, and wherein the method further includes receiving a different transaction request from a different user device operating in association with the second completion process, the different transaction request also corresponding to the subsequent transaction such that multiple user devices are submitting requests corresponding to the subsequent transaction.

\* \* \* \* \*

36